(12) United States Patent
Beiermann et al.

(10) Patent No.: US 12,304,028 B2
(45) Date of Patent: May 20, 2025

(54) ABRASIVE ARTICLE WITH MICROPARTICLE-COATED ABRASIVE GRAINS

(71) Applicant: 3M INNOVATIVE PROPERTIES COMPANY, St. Paul, MN (US)

(72) Inventors: Brett A. Beiermann, St. Paul, MN (US); Aaron K. Nienaber, Lake Elmo, MN (US); Joseph B. Eckel, Vadnais Heights, MN (US); Maiken Givot, St. Paul, MN (US); Thomas J. Nelson, Woodbury, MN (US); Robinette S. Alkhas, St. Paul, MN (US); Dwight D. Erickson, Woodbury, MN (US); Loc X. Van, Woodbury, MN (US); Melissa C. Schillo-Armstrong, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 706 days.

(21) Appl. No.: 17/309,751

(22) PCT Filed: Dec. 16, 2019

(86) PCT No.: PCT/IB2019/060845
§ 371 (c)(1),
(2) Date: Jun. 17, 2021

(87) PCT Pub. No.: WO2020/128780
PCT Pub. Date: Jun. 25, 2020

(65) Prior Publication Data
US 2022/0001514 A1 Jan. 6, 2022

Related U.S. Application Data

(60) Provisional application No. 62/780,958, filed on Dec. 18, 2018.

(51) Int. Cl.
*B24D 3/34* (2006.01)
*C09K 3/14* (2006.01)

(52) U.S. Cl.
CPC ............ *B24D 3/346* (2013.01); *C09K 3/1436* (2013.01)

(58) Field of Classification Search
CPC . B24D 3/346; B24D 5/02; B24D 5/12; B24D 5/14; B24D 3/14; C09K 3/1436
(Continued)

(56) References Cited

U.S. PATENT DOCUMENTS 2,527,044 A 10/1950 Walton
3,200,492 A 8/1965 Lehmkuhl
(Continued)

FOREIGN PATENT DOCUMENTS

CN 104023916 B 7/2017
JP 2009072835 A 4/2009
(Continued)

OTHER PUBLICATIONS

International Search Report for PCT International Application No. PCT/IB2019/060845, mailed on Mar. 31, 2020, 5 pages.
(Continued)

*Primary Examiner* — Joel D Crandall
(74) *Attorney, Agent, or Firm* — Katherine M. Scholz

(57) ABSTRACT

The disclosure relates to, among other things, abrasive particles comprising a microparticulate layer disposed on at least a portion of the outer surface of the abrasive particles, wherein the microparticulate layer comprises microparticles dispersed in a binder and the abrasive particles are shaped abrasive particles; abrasive articles comprising such abrasive particles, including coated abrasive articles, non-woven abrasive articles, and bonded abrasive articles; and methods of making those articles.

21 Claims, 17 Drawing Sheets

(58) Field of Classification Search
USPC .......................................................... 451/541
See application file for complete search history.

(56) References Cited

U.S. PATENT DOCUMENTS

| | | | |
|---|---|---|---|
| 4,997,461 A | | 3/1991 | Markhoff-Matheny |
| 5,039,311 A | * | 8/1991 | Bloecher .................. B24D 3/28 |
| | | | 51/307 |
| 5,213,591 A | | 5/1993 | Celikkaya |
| 5,352,254 A | | 10/1994 | Celikkaya |
| 5,441,549 A | | 8/1995 | Helmin |
| 5,552,225 A | | 9/1996 | Ho |
| 5,669,941 A | | 9/1997 | Peterson |
| 5,738,696 A | * | 4/1998 | Wu .......................... B24D 3/18 |
| | | | 51/296 |
| 5,851,247 A | | 12/1998 | Stoetzel et al. |
| 5,975,988 A | * | 11/1999 | Christianson .......... B24D 3/344 |
| | | | 451/28 |
| 6,217,413 B1 | | 4/2001 | Christianson |
| 6,251,149 B1 | | 6/2001 | Meyer |
| 6,811,582 B1 | | 11/2004 | Wurzer |
| 6,843,815 B1 | | 1/2005 | Thurber |
| 7,947,097 B2 | * | 5/2011 | You ........................ C08K 3/013 |
| | | | 51/293 |
| 8,142,531 B2 | | 3/2012 | Adefris |
| 8,864,862 B2 | | 10/2014 | Gebhardt |
| 8,870,985 B2 | * | 10/2014 | Wang .................... C09K 3/1409 |
| | | | 51/307 |
| 9,776,302 B2 | | 10/2017 | Keipert |
| 2002/0026752 A1 | | 3/2002 | Culler |
| 2008/0017421 A1 | | 1/2008 | Lockwood |
| 2013/0000215 A1 | * | 1/2013 | Wang ....................... B24D 3/14 |
| | | | 51/307 |
| 2013/0005221 A1 | * | 1/2013 | Wang ....................... B24B 7/22 |
| | | | 451/28 |
| 2016/0177154 A1 | * | 6/2016 | Josseaux ................... B01J 2/26 |
| | | | 51/307 |
| 2016/0311081 A1 | | 10/2016 | Culler |
| 2016/0311084 A1 | | 10/2016 | Culler |
| 2017/0225299 A1 | | 8/2017 | Keipert |
| 2018/0029194 A1 | | 2/2018 | Keipert |
| 2018/0187058 A1 | | 7/2018 | Nie |

FOREIGN PATENT DOCUMENTS

| | | |
|---|---|---|
| WO | 1994002562 A1 | 2/1994 |
| WO | WO 2006-034298 | 3/2006 |
| WO | 2006083688 W | 8/2006 |
| WO | WO 2006/083688 | 8/2006 |
| WO | WO 2008-079934 | 7/2008 |
| WO | WO 2011-109188 | 9/2011 |
| WO | WO 2015-100018 | 7/2015 |
| WO | 2016105469 A1 | 6/2016 |
| WO | WO 2018-081044 | 5/2018 |
| WO | WO 2018-081246 | 5/2018 |

OTHER PUBLICATIONS

"Diamond Machining of Optical Components", (Su) Aldamatsky, pp. 63-76, Machinery Industry Press, May 1991.

"Foundation Stone Processing Basics", Li Xiangqi, Lin Hui, pp. 162-166, China Building Materials Industry Press, Dec. 2016.

* cited by examiner

ABRASIVE ARTICLE WITH MICROPARTICLE-COATED ABRASIVE GRAINS

CROSS REFERENCE TO RELATED APPLICATIONS

This application is a national stage filing under 35 U.S.C. 371 of PCT/IB2019/060845, filed Dec. 16, 2019, which claims the benefit of U.S. Provisional Application No. 62/780,958, filed Dec. 18, 2018, the disclosure of which is incorporated by reference in its/their entirety herein.

BACKGROUND

Abrasive articles (e.g., bonded abrasive articles, including cut off wheels) containing abrasive particles can be used in combination with grinding aids, where the grinding aids are used as separate components to the abrasive articles. One of the functions of grinding aids is to increase the life of the abrasive article by functioning as coolants and/or lubricants.

DESCRIPTION OF THE FIGURES

The drawings illustrate generally, by way of example, but not by way of limitation, various embodiments discussed in the present document.

Figure 1A:
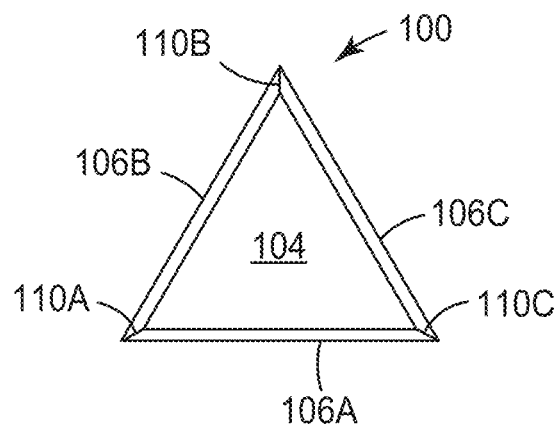
FIGS. 1A-1B are schematic diagrams of shaped abrasive particles having a planar trigonal shape, in accordance with various embodiments.

It should be understood that numerous other modifications and examples can be devised by those skilled in the art, which fall within the scope and spirit of the principles of the disclosure. Figures may not be drawn to scale.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

The instant disclosure provides, among other things, shaped abrasive particles comprising a microparticulate layer disposed on at least a portion of the outer surface of the abrasive particles, wherein the microparticulate layer comprises microparticles dispersed in a binder.

The microparticles can be integral to the abrasive particles and, as such, are not separate components that are added before use or in use, though the disclosure does contemplate the use of a combination of, e.g., grinding aids, and abrasive particles comprising a microparticulate layer disposed on at least a portion of the outer surface of the abrasive particles, wherein the microparticulate layer comprises microparticles dispersed in a binder.

It has been surprisingly found that when the microparticles are used in abrasive articles, such as cut-off wheels (COWs), one observes a significant improvement in performance—where performance is defined as the cut rate divided by the wheel wear rate—of over 50% relative to abrasive articles comprising abrasive particles lacking microparticles disposed on at least a portion of the outer surface of the abrasive particles.

The microparticles of the microparticulate layer can have any suitable microparticle size, e.g., in the µm range, including in a range of from about 0.5 µm to about 100 µm, about 0.5 µm to about 50 µm, about 1 µm to about 20 µm, about 1 µm to about 5 µm, about 40 µm to about 60 µm, or less than, equal to, or greater than about 20 µm, 30, 40, 50, 60, 70, 80, 90, or about 100 µm. The "microparticle size" refers to the largest dimension of the microparticles in the microparticulate layer. For example, the largest dimension of the microparticles can refer to a diameter, width, or height of the microparticle.

The microparticulate layer can comprise at least one of grinding aid microparticles and abrasive microparticles, wherein the abrasive microparticles can be made of the same material or a different material relative to the abrasive particles on which the abrasive microparticles are disposed.

As used herein, the term "grinding aid" generally refers to a substance that increases the workpiece cut rate and/or decreases an abrasive article's wear rate by any suitable mechanism, including at least one of lubricating the interface between the workpiece and the abrasive article and increases the ease by which stock is removed from a workpiece. Other mechanism by which a grinding aid operates are known and are described, for example, in U.S. Pat. No. 6,251,149 B1, which is incorporated by reference as if fully set forth herein in its entirety.

One suitable grinding aid microparticles include, for example, iron oxides, iron sulfides, and combinations thereof. Examples of iron sulfides include $FeS_2$ and FeS. Examples of iron oxides include $Fe_2O_3$. See, e.g., U.S. Pat. No. 5,552,225, which is incorporated by reference as if fully set forth herein.

Another suitable grinding aid microparticle includes wollastonite, which is composed of calcium, silicon and oxygen, with a molecular formula of $CaSiO_3$. Wollastonite can be procured from Imerys, under the tradename Wollastocoat®.

Examples of suitable grinding aid microparticles also include chlorinated waxes, halide salts, and combinations thereof. Examples of chlorinated waxes include tetrachloronaphthalene, pentachloronaphthalene, polyvinyl chloride, and combinations thereof. Examples of halide salts include sodium chloride, potassium cryolite, sodium cryolite, ammonium cryolite, potassium tetrafluoridoaluminate, sodium tetrafluoridoaluminate, potassium tetrafluoroborate, sodium tetrafluoroborate, silicon fluorides, potassium chloride, magnesium chloride, and combinations thereof.

Other examples of suitable grinding aid microparticles include hydrated fillers and inorganic non-halogenated fillers. Suitable hydrated fillers are those that dehydrate to release water during abrasive grinding of a metal workpiece. Examples of suitable hydrated fillers include zinc borate, available under the trademark FIREBRAKE™ ZB ($2ZnO \cdot 3B_2O_3 \cdot 3.5H_2O$: dehydrates at 293° C.) or under the trademark FIREBRAKE™ 415 ($4ZnO \cdot B_2O_3 \cdot H_2O$: dehydrates at 415° C.) from U.S. Borax; aluminum trihydrate ($Al(OH)_3$, available under the trademark HYDRAL™ 710 or PGA-SD™ from Alcoa); calcium hydroxide ($Ca(OH)_2$); magnesium hydroxide ($Mg(OH)_2$), available as FR-20 MHRM™ 23-2 (amino silane treated), FR-20 MHRM™ 640 (with polyolefin coupling agent) or FR-20 MHRM™ 120 (fatty surface treated) from Ameribrom, Inc.; hydrated sodium silicate ($Na_2SiO_3 \cdot 9H_2O$); alkali metal hydrates; nesquehonite ($MgCO_3 \cdot Mg(OH)_2 \cdot 3H_2O$); magnesium carbonate subhydrate ($MgO \cdot CO_2(0.96)H_2O(0.30)$); etc.

Specific hydrated fillers provide particularly preferred advantages. An especially preferred hydrated filler is zinc borate. Zinc borate vitrifies at 500-600° C. and is believed to form a borate-type glass seal over the organic bond, thereby preventing thermal degradation of the organic bond. Another hydrated filler, aluminum trihydrate, is believed to form aluminum oxide ($Al_2O_3$) upon heating and dehydration. Aluminum oxide is a known abrasive material which can aid in the grinding process. Preferred hydrated fillers include aluminum trihydrate and magnesium hydroxide.

Examples of suitable inorganic non-halogenated fillers include molybdenum (VI) oxide ($MoO_3$, available from Aldrich), sodium antimonate ($NaSbO_3$, available under the trademark THERMOGUARD™ FR from Elf Atochem), antimony oxide ($Sb_2O_3$, available under the trademark THERMOGUARD™ S from Elf Atochem), etc.

Grinding aid microparticles can be in any suitable form, including in the form of single microparticles or an agglomerate of grinding aid microparticles. Examples of precisely shaped grinding aid particles are taught in U.S. Patent Publ. No. 2002/0026752 A1, which is incorporated by reference as if fully set forth herein.

Microparticles in the microparticulate layer can be present in any suitable amount, including in amounts of from about 0.1 wt % to about 25 wt %, about 0.1 wt % to about 10 wt %, about 1 wt % to 5 wt % or about 10 wt % to about 20 wt % of the abrasive particles, subject to weight range requirements of the other constituents being met.

The microparticulate layer can comprise microparticles disposed on at least a portion of the outer surface of the abrasive particles (e.g., at least a portion of the outer surface of each of a plurality of the abrasive particles), such as on at least about 10%, at least about 20%, at least about 30%, at least about 40%, at least about 50%, at least about 60%, at least about 70%, at least about 80%, at least about 90% or up to about 100% of the outer surface of the abrasive particles. For example, the microparticulate layer can comprise microparticles disposed on about 10% to about 90%, about 20% to about 50%, about 30% to about 70%, about 50% to about 90%, about 60% to about 100%, about 40% to about 80% or about 70% to about 99% of the outer surface of the abrasive particles.

The microparticulate layer can comprise microparticles bound on at least a portion of the outer surface of the abrasive particles with a binder. The binder can be any suitable binder, including an inorganic binder or an organic binder. Examples of inorganic binders include, but are not limited to lime, clay, silicate binders, and mixtures thereof. Examples of silicate binders include sodium silicate binder, a potassium silicate binder, and mixtures thereof. Organic binders include, but are not limited to, polymeric binders, such as acrylic polymers, polyurethanes, poly (lactic acid), poly (vinyl pyrrolidone), phenoxy resins or combinations thereof.

A wide variety of abrasive particles (and abrasive microparticles) can be utilized. The abrasive particles can be provided in a variety of sizes, shapes and profiles, including, for example, random or crushed shapes, regular (e.g. symmetric) profiles such as square, star-shaped or hexagonal profiles, and irregular (e.g. asymmetric) profiles. For example, the abrasive particles can be a mixture of different types of abrasive particles. For example, the abrasive article may include mixtures of platey and non-platey particles, crushed and shaped particles (conventional non-shaped and non-platey abrasive particles (e.g. filler material) and abrasive particles of different sizes.

As used herein "shaped particle" and "shaped abrasive particle" means an abrasive particle having a predetermined or non-random shape. One process to make a shaped abrasive particle such as a shaped ceramic abrasive particle includes shaping the precursor ceramic abrasive particle in a mold having a predetermined shape to make ceramic shaped abrasive particles. Ceramic shaped abrasive particles, formed in a mold, are one species in the genus of shaped ceramic abrasive particles. Other processes to make other species of shaped ceramic abrasive particles include extruding the precursor ceramic abrasive particle through an orifice having a predetermined shape, printing the precursor ceramic abrasive particle though an opening in a printing screen having a predetermined shape, or embossing the precursor ceramic abrasive particle into a predetermined shape or pattern. In other examples, the shaped ceramic abrasive particles can be cut from a sheet into individual particles. Examples of suitable cutting methods include mechanical cutting, laser cutting, or water-jet cutting. Non-limiting examples of shaped ceramic abrasive particles include shaped abrasive particles, such as triangular plates, or elongated ceramic rods/filaments. Shaped ceramic abrasive particles are generally homogenous or substantially uniform and maintain their sintered shape without the use of a binder such as an organic or inorganic binder that bonds smaller abrasive particles into an agglomerated structure and excludes abrasive particles obtained by a crushing or comminution process that produces abrasive particles of random size and shape. In many embodiments, the shaped ceramic abrasive particles comprise a homogeneous structure of sintered alpha alumina or consist essentially of sintered alpha alumina.

Figure 1B:
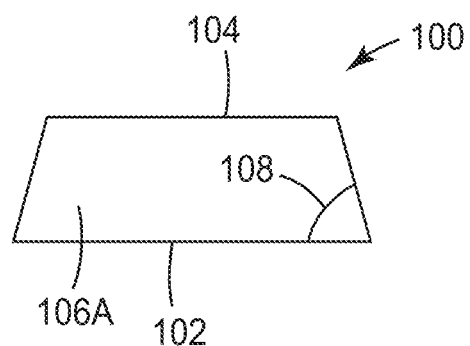

FIGS. 1A and 1B show an example of shaped abrasive particle 100, as an equilateral triangle conforming to a truncated pyramid. As shown in FIGS. 1A and 1B shaped abrasive particle 100 includes a truncated regular triangular pyramid bounded by a triangular base 102, a triangular top 104, and plurality of sloping sides 106A, 106B, 106C connecting triangular base 102 (shown as equilateral although scalene, obtuse, isosceles, and right triangles are possible) and triangular top 104. The shaped abrasive particles described herein comprise a microparticulate layer (not shown) disposed on at least a portion of the outer surface of the abrasive particles (e.g., on at least one of triangular top 104 and sloping sides 106A-C), wherein the microparticulate layer comprises microparticles dispersed in a binder.

Slope angle 108A is the dihedral angle formed by the intersection of side 106A with triangular base 102. Similarly, slope angles 108B and 108C (both not shown) correspond to the dihedral angles formed by the respective intersections of sides 106B and 106C with triangular base 102. In the case of shaped abrasive particle 100, all of the slope angles have equal value. In some embodiments, side edges 110A, 110B, and 110C have an average radius of curvature in a range of from about 0.5 µm to about 80 µm, about 10 µm to about 60 µm, or less than, equal to, or greater than about 0.5 µm, 5, 10, 15, 20, 25, 30, 35, 40, 45, 50, 55, 60, 65, 70, 75, or about 80 µm.

In the embodiment shown in FIGS. 1A and 1B, sides 106A, 106B, and 106C have equal dimensions and form dihedral angles with the triangular base 102 of about 82 degrees (corresponding to a slope angle of 82 degrees). However, it will be recognized that other dihedral angles (including 90 degrees) may also be used. For example, the dihedral angle between the base and each of the sides may independently range from 45 to 90 degrees (for example, from 70 to 90 degrees, or from 75 to 85 degrees). Edges connecting sides 106, base 102, and top 104 can have any suitable length. For example, a length of the edges may be in a range of from about 0.5 µm to about 2000 µm, about 150 µm to about 200 µm, or less than, equal to, or greater than about 0.5 µm, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or about 2000 µm.

Figure 2A:
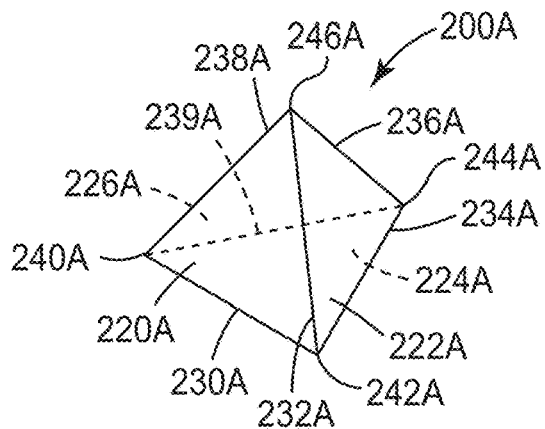
FIGS. 2A-2E are schematic diagrams of shaped abrasive particles having a tetrahedral shape, in accordance with various embodiments.

FIGS. 2A-2E are perspective views of the shaped abrasive particles 200 shaped as tetrahedral abrasive particles. As shown in FIGS. 2A-2E, shaped abrasive particles 200 are shaped as regular tetrahedrons. As shown in FIG. 2A, shaped abrasive particle 200A has four faces (220A, 222A, 224A, and 226A) joined by six edges (230A, 232A, 234A, 236A, 238A, and 239A) terminating at four vertices (240A, 242A, 244A, and 246A). Each of the faces contacts the other three of the faces at the edges. While a regular tetrahedron (e.g., having six equal edges and four faces) is depicted in FIG. 2A, it will be recognized that other shapes are also permissible. For example, tetrahedral abrasive particles 200 can be shaped as irregular tetrahedrons (e.g., having edges of differing lengths). The shaped abrasive particles described by FIGS. 2A-2E comprise a microparticulate layer (not shown) disposed on at least a portion of the outer surface of the abrasive particles (e.g., faces 220A, 222A, 224A, and 226A), wherein the microparticulate layer comprises microparticles dispersed in a binder.

Figure 2B:
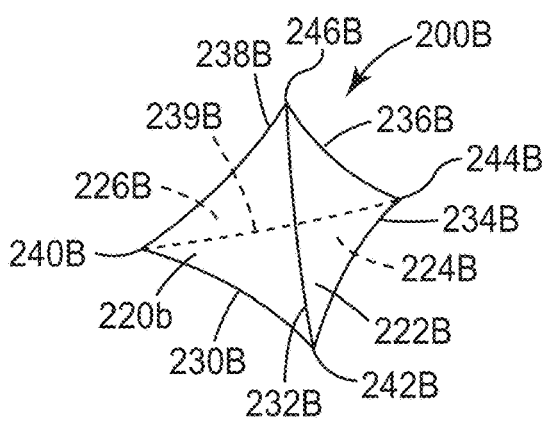

Referring now to FIG. 2B, shaped abrasive particle 200B has four faces (220B, 222B, 224B, and 226B) joined by six edges (230B, 232B, 234B, 236B, 238B, and 239B) terminating at four vertices (240B, 242B, 244B, and 246B). Each of the faces is concave and contacts the other three of the faces at respective common edges. While a particle with tetrahedral symmetry (e.g., four rotational axes of threefold symmetry and six reflective planes of symmetry) is depicted in FIG. 2B, it will be recognized that other shapes are also permissible. For example, shaped abrasive particles 200B can have one, two, or three concave faces with the remainder being planar.

Figure 2C:
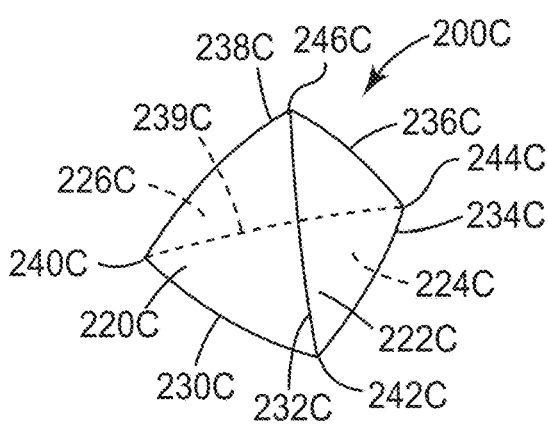

Referring now to FIG. 2C, shaped abrasive particle 200C has four faces (220C, 222C, 224C, and 226C) joined by six edges (230C, 232C, 234C, 236C, 238C, and 239C) terminating at four vertices (240C, 242C, 244C, and 246C). Each of the faces is convex and contacts the other three of the faces at respective common edges. While a particle with tetrahedral symmetry is depicted in FIG. 2C, it will be recognized that other shapes are also permissible. For example, shaped abrasive particles 200C can have one, two, or three convex faces with the remainder being planar or concave.

Figure 2D:
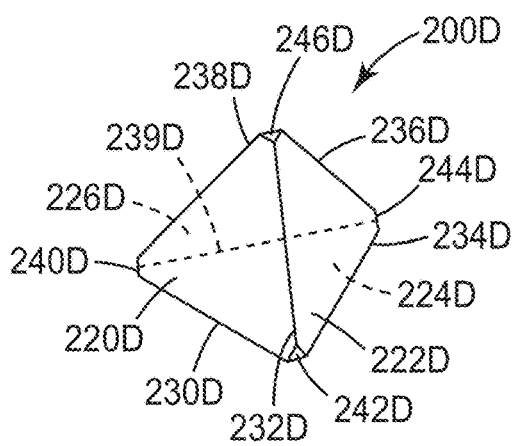

Referring now to FIG. 2D, shaped abrasive particle 200D has four faces (220D, 222D, 224D, and 226D) joined by six edges (230D, 232D, 234D, 236D, 238D, and 239D) terminating at four vertices (240D, 242D, 244D, and 246D). While a particle with tetrahedral symmetry is depicted in FIG. 2D, it will be recognized that other shapes are also permissible. For example, shaped abrasive particles 200D can have one, two, or three convex faces with the remainder being planar.

Figure 2E:
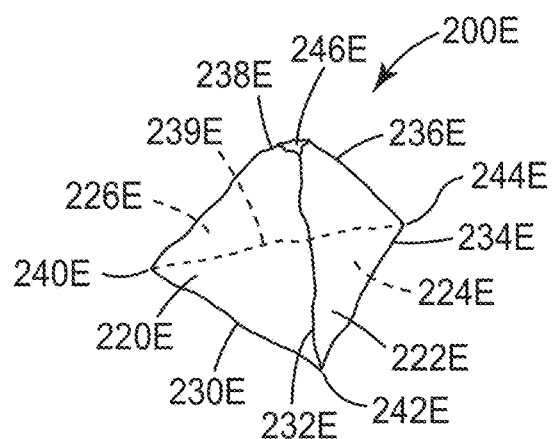

Deviations from the depictions in FIGS. 2A-2D can be present. An example of such a shaped abrasive particle 200 is depicted in FIG. 2E, showing shaped abrasive particle 200E, which has four faces (220E, 222E, 224E, and 226E) joined by six edges (230E, 232E, 234E, 236E, 238E, and 239E) terminating at four vertices (240E, 242E, 244E, and 246E). Each of the faces contacts the other three of the faces at respective common edges. Each of the faces, edges, and vertices has an irregular shape.

In any of shaped abrasive particles 200A-200E, the edges can have the same length or different lengths. The length of any of the edges can be any suitable length. As an example, the length of the edges can be in a range of from about 0.5 µm to about 2000 µm, about 150 µm to about 200 µm, or less than, equal to, or greater than about 0.5 µm, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or about 2000 µm. shaped abrasive particles 200A-200E can be the same size or different sizes.

Any of shaped abrasive particles 100 or 200 can include any number of shape features. The shape features can help to improve the cutting performance of any of shaped abrasive particles 100 or 200. Examples of suitable shape features include an opening, a concave surface, a convex surface, a groove, a ridge, a fractured surface, a low roundness factor, or a perimeter comprising one or more corner points having a sharp tip. Individual shaped abrasive particles can include any one or more of these features.

In addition to the materials already described, at least one magnetic material can be included within or coated to shaped abrasive particle 100 or 200. Examples of magnetic materials include iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$; MnAs; ferrites such as ferrite, magnetite; zinc ferrite; nickel ferrite; cobalt ferrite, magnesium ferrite, barium ferrite, and strontium ferrite; yttrium iron garnet; and combinations of the foregoing. In some embodiments, the magnetizable material is an alloy containing 8 to 12 weight percent aluminum, 15 to 26 wt % nickel, 5 to 24 wt % cobalt, up to 6 wt % copper, up to 1% titanium, wherein the balance of material to add up to 100 wt % is iron. In some other embodiments, a magnetizable coating can be deposited on an abrasive particle 100 using a vapor deposition technique such as, for example, physical vapor deposition (PVD) including magnetron sputtering.

Including these magnetizable materials can allow shaped abrasive particle 100 or 200 to be responsive a magnetic field. Any of shaped abrasive particles 100 or 200 can include the same material or include different materials.

Shaped abrasive particle 100 or 200 can be formed in many suitable manners for example, the shaped abrasive particle 100 or 200 can be made according to a multi-operation process. The process can be carried out using any material or precursor dispersion material. Briefly, for embodiments where shaped abrasive particles 100 or 200 are monolithic ceramic particles, the process can include the operations of making either a seeded or non-seeded precursor dispersion that can be converted into a corresponding (e.g., a boehmite sol-gel that can be converted to alpha alumina); filling one or more mold cavities having the desired outer shape of shaped abrasive particle 100 with a precursor dispersion; drying the precursor dispersion to form precursor shaped abrasive particle; removing the precursor shaped abrasive particle 100 from the mold cavities; calcining the precursor shaped abrasive particle 100 to form calcined, precursor shaped abrasive particle 100 or 200; and then sintering the calcined, precursor shaped abrasive particle 100 or 200 to form shaped abrasive particle 100 or 200. The process will now be described in greater detail in the context of alpha-alumina-containing shaped abrasive particle 100 or 200. In other embodiments, the mold cavities may be filled with a melamine to form melamine shaped abrasive particles.

Some shaped abrasive particles 100 or 200 can include a polymeric material and can be characterized as soft abrasive particles. The soft shaped abrasive particles described herein can independently include any suitable material or combination of materials. For example, the soft shaped abrasive particles can include a reaction product of a polymerizable mixture including one or more polymerizable resins. The one or more polymerizable resins such as a hydrocarbyl polymerizable resin. Examples of such resins include those chosen from a phenolic resin, a urea formaldehyde resin, a urethane resin, a melamine resin, an epoxy resin, a bismaleimide resin, a vinyl ether resin, an aminoplast resin (which may include pendant alpha, beta unsaturated carbonyl groups), an acrylate resin, an acrylated isocyanurate resin, an isocyanurate resin, an acrylated urethane resin, an acrylated epoxy resin, an alkyl resin, a polyester resin, a drying oil, or mixtures thereof. The polymerizable mixture can include additional components such as a plasticizer, an acid catalyst, a cross-linker, a surfactant, a mild-abrasive, a pigment, a catalyst and an antibacterial agent.

Where multiple components are present in the polymerizable mixture, those components can account for any suitable weight percentage of the mixture. For example, the polymerizable resin or resins, may be in a range of from about 35 wt % to about 99.9 wt % of the polymerizable mixture, about 40 wt % to about 95 wt %, or less than, equal to, or greater than about 35 wt %, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or about 99.9 wt %.

If present, the cross-linker may be in a range of from about 2 wt % to about 60 wt % of the polymerizable mixture, from about 5 wt % to about 10 wt %, or less than, equal to, or greater than about 2 wt %, 3, 4, 5, 6, 7, 8, 9, 10, 11, 12, 13, 14, or about 15 wt %. Examples of suitable cross-linkers include a cross-linker available under the trade designation CYMEL 303 LF, of Allnex USA Inc., Alpharetta, Georgia, USA; or a cross-linker available under the trade designation CYMEL 385, of Allnex USA Inc., Alpharetta, Georgia, USA.

If present, the mild-abrasive may be in a range of from about 5 wt % to about 65 wt % of the polymerizable mixture, about 10 wt % to about 20 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or about 65 wt %. Examples of suitable mild-abrasives include a mild-abrasive available under the trade designation MINSTRON 353 TALC, of Imerys Talc America, Inc., Three Forks, Montana, USA; a mild-abrasive available under the trade designation USG TERRA ALBA NO.1 CALCIUM SULFATE, of USG Corporation, Chicago, Illinois, USA; Recycled Glass (40-70 Grit) available from ESCA Industries, Ltd., Hatfield, Pennsylvania, USA, silica, calcite, nepheline, syenite, calcium carbonate, or mixtures thereof.

If present, the plasticizer may be in a range of from about 5 wt % to about 40 wt % of the polymerizable mixture, about 10 wt % to about 15 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or about 40 wt %. Examples of suitable plasticizers include acrylic resins or styrene butadiene resins. Examples of acrylic resins include an acrylic resin available under the trade designation RHOPLEX GL-618, of DOW Chemical Company, Midland, Michigan, USA; an acrylic resin available under the trade designation HYCAR 2679, of the Lubrizol Corporation, Wickliffe, Ohio, USA; an acrylic resin available under the trade designation HYCAR 26796, of the Lubrizol Corporation, Wickliffe, Ohio, USA; a polyether polyol available under the trade designation ARCOL LG-650, of DOW Chemical Company, Midland, Michigan, USA; or an acrylic resin available under the trade designation HYCAR 26315, of the Lubrizol Corporation, Wickliffe, Ohio, USA. An example of a styrene butadiene resin includes a resin available under the trade designation ROVENE 5900, of Mallard Creek Polymers, Inc., Charlotte, North Carolina, USA.

If present, the acid catalyst may be in a range of from 1 wt % to about 20 wt % of the polymerizable mixture, about 5 wt % to about 10 wt %, or less than, equal to, or greater than about 1 wt %, 2, 3, 4, 5, 6, 7, 8, 9, 10, 11, 12, 13, 14, 15, 16, 17, 18, 19, or about 20 wt %. Examples of suitable acid catalysts include a solution of aluminum chloride or a solution of ammonium chloride.

If present, the surfactant can be in a range of from about 0.001 wt % to about 15 wt % of the polymerizable mixture about 5 wt % to about 10 wt %, less than, equal to, or greater than about 0.001 wt %, 0.01, 0.5, 1, 2, 3, 4, 5, 6, 7, 8, 9, 10, 11, 12, 13, 14, or about 15 wt %. Examples of suitable surfactants include a surfactant available under the trade designation GEMTEX SC-85-P, of Innospec Performance Chemicals, Salisbury, North Carolina, USA; a surfactant available under the trade designation DYNOL 604, of Air Products and Chemicals, Inc., Allentown, Pennsylvania, USA; a surfactant available under the trade designation ACRYSOL RM-8W, of DOW Chemical Company, Midland, Michigan, USA; or a surfactant available under the trade designation XIAMETER AFE 1520, of DOW Chemical Company, Midland, Michigan, USA.

If present, the antimicrobial agent may be in a range of from 0.5 wt % to about 20 wt % of the polymerizable mixture, about 10 wt % to about 15 wt %, or less than, equal to, or greater than about 0.5 wt %, 1, 2, 3, 4, 5, 6, 7, 8, 9, 10, 11, 12, 13, 14, 15, 16, 17, 18, 19, or about 20 wt %. An example of a suitable antimicrobial agent includes zinc pyrithione.

If present, the pigment may be in a range of from about 0.1 wt % to about 10 wt % of the polymerizable mixture, about 3 wt % to about 5 wt %, less than, equal to, or greater than about 0.1 wt %, 0.2, 0.4, 0.6, 0.8, 1, 1.5, 2, 2.5, 3, 3.5, 4, 4.5, 5, 5.5, 6, 6.5, 7, 7.5, 8, 8.5, 9, 9.5, or about 10 wt %. Examples of suitable pigments include a pigment dispersion available under the trade designation SUNSPERSE BLUE 15, of Sun Chemical Corporation, Parsippany, New Jersey, USA; a pigment dispersion available under the trade designation SUNSPERSE VIOLET 23, of Sun Chemical Corporation, Parsippany, New Jersey, USA; a pigment dispersion available under the trade designation SUN BLACK, of Sun Chemical Corporation, Parsippany, New Jersey, USA; or a pigment dispersion available under the trade designation BLUE PIGMENT B2G, of Clariant Ltd., Charlotte, North Carolina, USA. The mixture of components can be polymerized by curing.

The process can include the operation of providing either a seeded or non-seeded dispersion of a precursor that can be converted into ceramic. In examples where the precursor is seeded, the precursor can be seeded with an oxide of an iron (e.g., FeO). The precursor dispersion can include a liquid that is a volatile component. In one example, the volatile component is water. The dispersion can include a sufficient amount of liquid for the viscosity of the dispersion to be sufficiently low to allow filling mold cavities and replicating the mold surfaces, but not so much liquid as to cause subsequent removal of the liquid from the mold cavity to be prohibitively expensive. In one example, the precursor dispersion includes from 2 percent to 90 percent by weight of the particles that can be converted into ceramic, such as particles of aluminum oxide monohydrate (boehmite), and at least 10 percent by weight, or from 50 percent to 70 percent, or 50 percent to 60 percent, by weight, of the volatile component such as water. Conversely, the precursor dispersion in some embodiments contains from 30 percent to 50 percent, or 40 percent to 50 percent solids by weight.

Examples of suitable precursor dispersions include zirconium oxide sols, vanadium oxide sols, cerium oxide sols, aluminum oxide sols, and combinations thereof. Suitable aluminum oxide dispersions include, for example, boehmite dispersions and other aluminum oxide hydrates dispersions. Boehmite can be prepared by known techniques or can be obtained commercially. Examples of commercially available boehmite include products having the trade designations "DISPERAL" and "DISPAL", both available from Sasol North America, Inc., or "HIQ-40" available from BASF Corporation. These aluminum oxide monohydrates are relatively pure; that is, they include relatively little, if any, hydrate phases other than monohydrates, and have a high surface area.

The physical properties of the resulting shaped abrasive particle 100 or 200 can generally depend upon the type of material used in the precursor dispersion. As used herein, a "gel" is a three-dimensional network of solids dispersed in a liquid.

The precursor dispersion can contain a modifying additive or precursor of a modifying additive. The modifying additive can function to enhance some desirable property of the abrasive particles or increase the effectiveness of the subsequent sintering step. Modifying additives or precursors of modifying additives can be in the form of soluble salts, such as water-soluble salts. They can include a metal-containing compound and can be a precursor of an oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the precursor dispersion can be varied.

The introduction of a modifying additive or precursor of a modifying additive can cause the precursor dispersion to gel. The precursor dispersion can also be induced to gel by application of heat over a period of time to reduce the liquid content in the dispersion through evaporation. The precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina.

A peptizing agent can be added to the precursor dispersion to produce a more stable hydrosol or colloidal precursor dispersion. Suitable peptizing agents are monoprotic acids or acid compounds such as acetic acid, hydrochloric acid, formic acid, and nitric acid. Multiprotic acids can also be used, but they can rapidly gel the precursor dispersion, making it difficult to handle or to introduce additional components. Some commercial sources of boehmite contain an acid titer (such as absorbed formic or nitric acid) that will assist in forming a stable precursor dispersion.

The precursor dispersion can be formed by any suitable means; for example, in the case of a sol-gel alumina precursor, it can be formed by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired.

A further operation can include providing a mold having at least one mold cavity, or a plurality of cavities formed in at least one major surface of the mold. In some examples, the mold is formed as a production tool, which can be, for example, a belt, a sheet, a continuous web, a coating roll such as a rotogravure roll, a sleeve mounted on a coating roll, or a die. In one example, the production tool can include polymeric material. Examples of suitable polymeric materials include thermoplastics such as polyesters, polycarbonates, poly (ether sulfone), poly (methyl methacrylate), polyurethanes, polyvinylchloride, polyolefin, polystyrene, polypropylene, polyethylene or combinations thereof, or thermosetting materials. In one example, the entire tooling is made from a polymeric or thermoplastic material. In another example, the surfaces of the tooling in contact with the precursor dispersion while the precursor dispersion is drying, such as the surfaces of the plurality of cavities, include polymeric or thermoplastic materials, and other portions of the tooling can be made from other materials. A suitable polymeric coating can be applied to a metal tooling to change its surface tension properties, by way of example.

A polymeric or thermoplastic production tool can be replicated off a metal master tool. The master tool can have the inverse pattern of that desired for the production tool. The master tool can be made in the same manner as the production tool. In one example, the master tool is made out of metal (e.g., nickel) and is diamond-turned. In one example, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tool. If a thermoplastic production tool is utilized, then care should be taken not to generate excessive heat that can distort the thermoplastic production tool, limiting its life.

Access to cavities can be from an opening in the top surface or bottom surface of the mold. In some examples, the cavities can extend for the entire thickness of the mold. Alternatively, the cavities can extend only for a portion of the thickness of the mold. In one example, the top surface is substantially parallel to the bottom surface of the mold with the cavities having a substantially uniform depth. At least one side of the mold, the side in which the cavities are formed, can remain exposed to the surrounding atmosphere during the step in which the volatile component is removed.

The cavities have a specified three-dimensional shape to make shaped abrasive particle 100. The depth dimension is equal to the perpendicular distance from the top surface to the lowermost point on the bottom surface. The depth of a given cavity can be uniform or can vary along its length and/or width. The cavities of a given mold can be of the same shape or of different shapes.

A further operation involves filling the cavities in the mold with the precursor dispersion (e.g., by a conventional technique). In some examples, a knife roll coater or vacuum slot die coater can be used. A mold release agent can be used to aid in removing the particles from the mold if desired. Examples of mold release agents include oils such as peanut oil or mineral oil, fish oil, silicones, polytetrafluoroethylene, zinc stearate, and graphite. In general, a mold release agent such as peanut oil, in a liquid, such as water or alcohol, is applied to the surfaces of the production tooling in contact with the precursor dispersion such that from about 0.1 mg/in$^2$ (0.6 mg/cm$^2$) to about 3.0 mg/in$^2$ (20 mg/cm$^2$), or from about 0.1 mg/in$^2$ (0.6 mg/cm$^2$) to about 5.0 mg/in$^2$ (30 mg/cm$^2$), of the mold release agent is present per unit area of the mold when a mold release is desired. In some embodiments, the top surface of the mold is coated with the precursor dispersion. The precursor dispersion can be pumped onto the top surface.

In a further operation, a scraper or leveler bar can be used to force the precursor dispersion fully into the cavity of the mold. The remaining portion of the precursor dispersion that does not enter the cavity can be removed from the top surface of the mold and recycled. In some examples, a small portion of the precursor dispersion can remain on the top surface, and in other examples the top surface is substantially free of the dispersion. The pressure applied by the scraper or leveler bar can be less than 100 psi (0.6 MPa), or less than 50 psi (0.3 MPa), or even less than 10 psi (60 kPa). In some examples, no exposed surface of the precursor dispersion extends substantially beyond the top surface.

In those examples where it is desired to have the exposed surfaces of the cavities result in planar faces of the shaped abrasive particles, it can be desirable to overfill the cavities (e.g., using a micronozzle array) and slowly dry the precursor dispersion.

A further operation involves removing the volatile component to dry the dispersion. The volatile component can be removed by fast evaporation rates. In some examples, removal of the volatile component by evaporation occurs at temperatures above the boiling point of the volatile component. An upper limit to the drying temperature often depends on the material the mold is made from. For polypropylene tooling, the temperature should be less than the melting point of the plastic. In one example, for a water dispersion of from about 40 to 50 percent solids and a polypropylene mold, the drying temperatures can be from about 90° C. to about 165° C., or from about 105° C. to about 150° C., or from about 105° C. to about 120° C. Higher temperatures can lead to improved production speeds but can also lead to degradation of the polypropylene tooling, limiting its useful life as a mold.

During drying, the precursor dispersion shrinks, often causing retraction from the cavity walls. For example, if the cavities have planar walls, then the resulting shaped abrasive particle 100 can tend to have at least three concave major sides. It is presently discovered that by making the cavity walls concave (whereby the cavity volume is increased) it is possible to obtain shaped abrasive particle 100 that have at least three substantially planar major sides. The degree of concavity generally depends on the solids content of the precursor dispersion.

A further operation involves removing resultant precursor shaped abrasive particle 100 from the mold cavities. The precursor shaped abrasive particle 100 or 200 can be removed from the cavities by using the following processes alone or in combination on the mold: gravity, vibration, ultrasonic vibration, vacuum, or pressurized air to remove the particles from the mold cavities.

The precursor shaped abrasive particle 100 or 200 can be further dried outside of the mold. If the precursor dispersion is dried to the desired level in the mold, this additional drying step is not necessary. However, in some instances it can be economical to employ this additional drying step to minimize the time that the precursor dispersion resides in the mold. The precursor shaped abrasive particle 100 or 200 will be dried from 10 to 480 minutes, or from 120 to 400 minutes, at a temperature from 50° C. to 160° C., or 120° C. to 150° C.

A further operation involves calcining the precursor shaped abrasive particle 100 or 200. During calcining, essentially all the volatile material is removed, and the various components that were present in the precursor dispersion are transformed into metal oxides. The precursor shaped abrasive particle 100 or 200 is generally heated to a temperature from 400° C. to 800° C. and maintained within this temperature range until the free water and over 90 percent by weight of any bound volatile material are removed. In an optional step, it can be desirable to introduce the modifying additive by an impregnation process. A water-soluble salt can be introduced by impregnation into the pores of the calcined, precursor shaped abrasive particle 100. Then the precursor shaped abrasive particle 100 are pre-fired again.

A further operation can involve sintering the calcined, precursor shaped abrasive particle 100 or 200 to form particles 100 or 200. In some examples where the precursor includes rare earth metals, however, sintering may not be necessary. Prior to sintering, the calcined, precursor shaped abrasive particle 100 or 200 are not completely densified and thus lack the desired hardness to be used as shaped abrasive particle 100 or 200. Sintering takes place by heating the calcined, precursor shaped abrasive particle 100 or 200 to a temperature of from 1000° C. to 1650° C. The length of time for which the calcined, precursor shaped abrasive particle 100 or 200 can be exposed to the sintering temperature to achieve this level of conversion depends upon various factors, but from five seconds to 48 hours is possible.

In another embodiment, the duration of the sintering step ranges from one minute to 90 minutes. After sintering, the shaped abrasive particle 14 can have a Vickers hardness of 10 GPa (gigaPascals), 16 GPa, 18 GPa, 20 GPa, or greater.

Additional operations can be used to modify the described process, such as, for example, rapidly heating the material from the calcining temperature to the sintering temperature, and centrifuging the precursor dispersion to remove sludge and/or waste. Moreover, the process can be modified by combining two or more of the process steps if desired.

Any of the abrasive articles described herein can be continuous or can comprise abrasive segments.

Figure 3A:
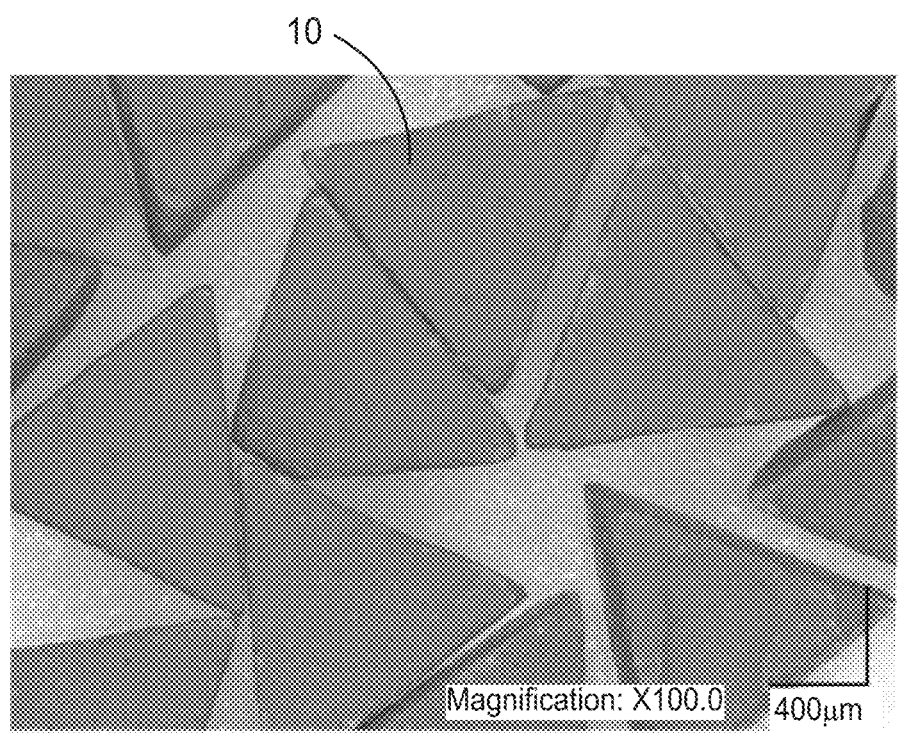
FIG. 3A-3D illustrate shaped abrasive particles coated in microparticles in accordance with various embodiments.
Figure 3B:
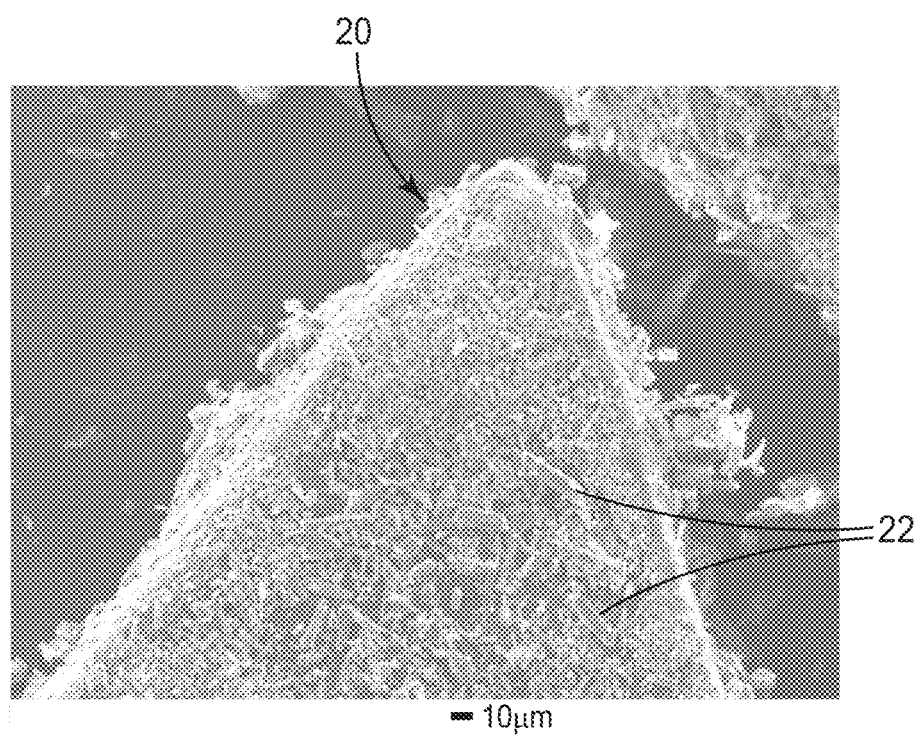
Figure 3C:
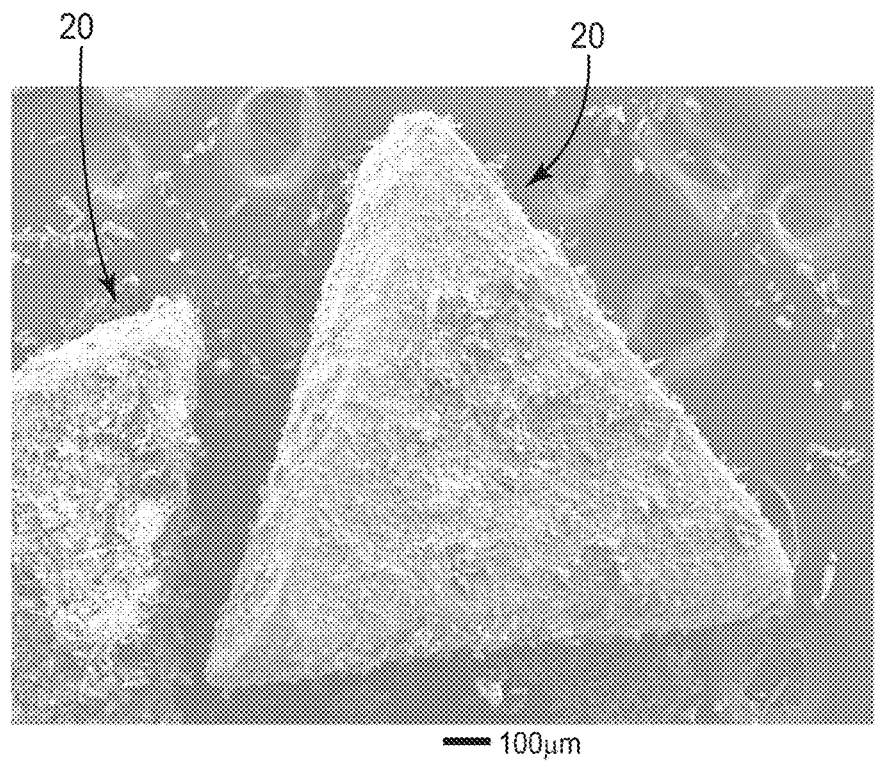
Figure 3D:
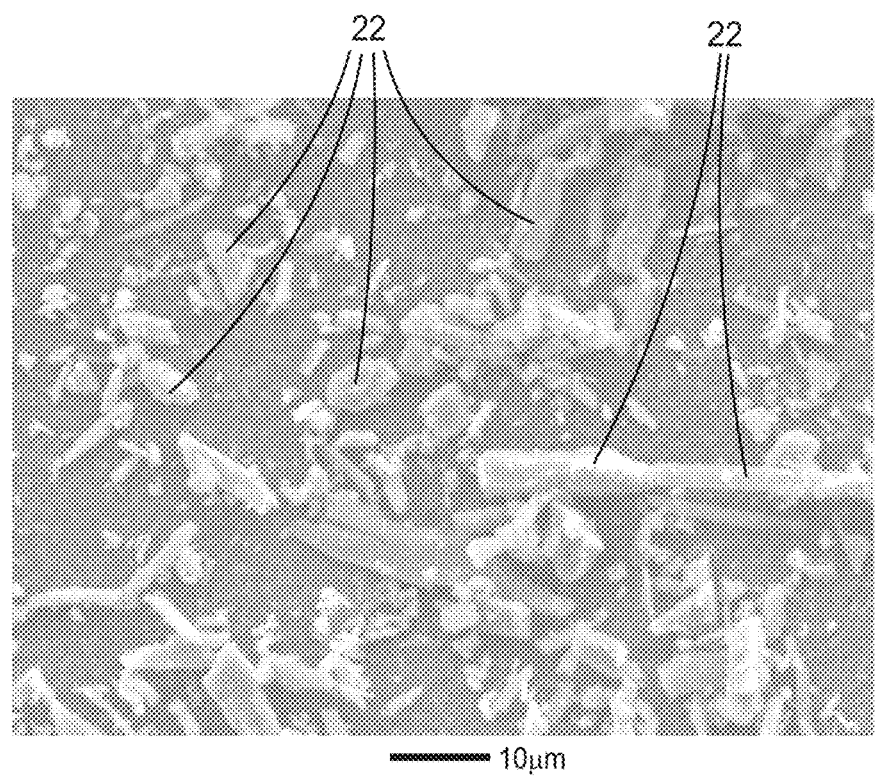

FIG. 3A-3D illustrate shaped abrasive particles coated in microparticles in accordance with various embodiments. FIG. 3A illustrates shaped abrasive particles 10 coated with red microparticles. The red microparticles are made of $Fe_2O_3$. FIG. 3B illustrates shaped abrasive particles 20 coated with wollastonite microparticles 22. FIGS. 3C and 3D illustrate closer views of particles 20. FIG. 3C is an image taken at 65×. FIG. 3D is an image taken at 1400×. The ratio in longest particle dimension between shaped abrasive particles 10 and 20 to microparticles can range from about 10:1 to about 100:1 to about 1000:1 to about 10,000:1.

Microparticles have been previously applied to abrasive particles. Microparticles increase the surface area of an abrasive particle, increasing the bond strength between the abrasive particle and the surrounding resin matrix. This can increase the overall useful life of an abrasive article that incorporates microparticles onto the structure of abrasive particles. While microparticles have previously been applied to crushed or platey particles, embodiments described herein apply microparticles to precision shaped abrasive particles.

Microparticles previously applied to abrasive particles have often been spherical in shape. As illustrated in the Examples include herein, it was surprisingly found that rod or plate shaped microparticles showed better performance. It was surprisingly found that increasing the aspect ratio of the microparticles resulted in improved performance. In some embodiments, the aspect ratio is greater than about 2, or greater than about 3, or greater than about 4, or greater than about 5, or greater than about 10, or greater than about 50, or greater than about 100, or greater than about 500, or greater than about 1000.

It was also found that controlling the amount of microparticles, and microparticle binder, in the coating on each shaped abrasive article. The microparticle binder should be at least 0.1% by weight of the coated shaped abrasive particle. In some embodiments, the microparticle binder is at least 0.2% by weight of the coated shaped abrasive particle, or at least 0.3%, or at least 0.4%, or at least 0.5%, or at least 0.6%, or at least 0.7%, or at least 0.8%, or at least 0.9%, or at least 1% by weight. In lower ranges, the effect is not achieved.

Figure 4B:
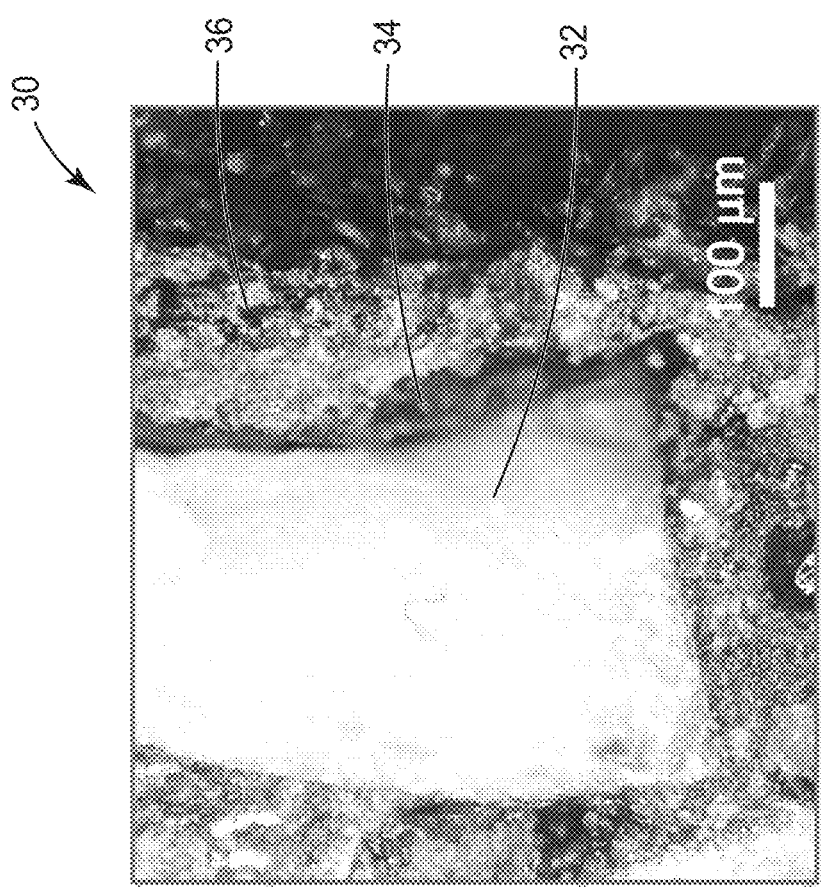
FIGS. 4A-4B illustrate a bonded abrasive article in accordance with various embodiments.
Figure 4A:
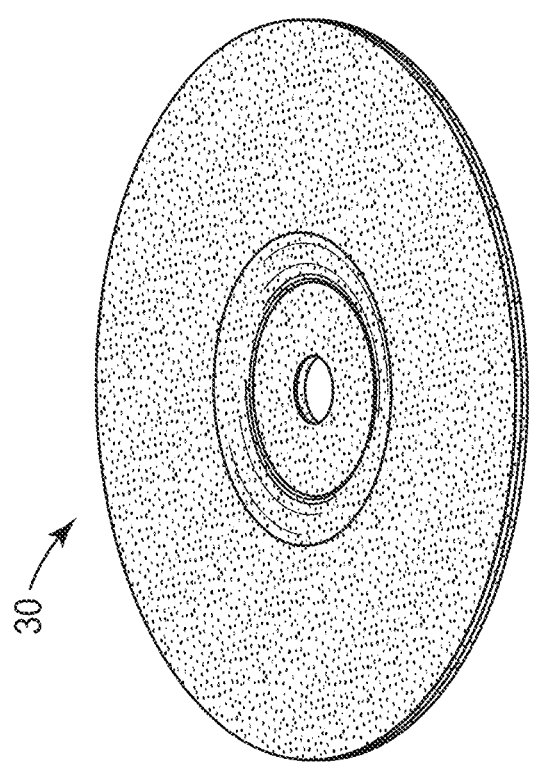

FIGS. 4A-4B illustrate a bonded abrasive article in accordance with various embodiments. FIG. 4A illustrates a depressed center grinding wheel 30. FIG. 4B illustrates a close-up view of a cross-section of a shaped abrasive particle 32 within a resin matrix 36. Shaped abrasive particle 32 has a microparticle coating 34.

Figure 5A:
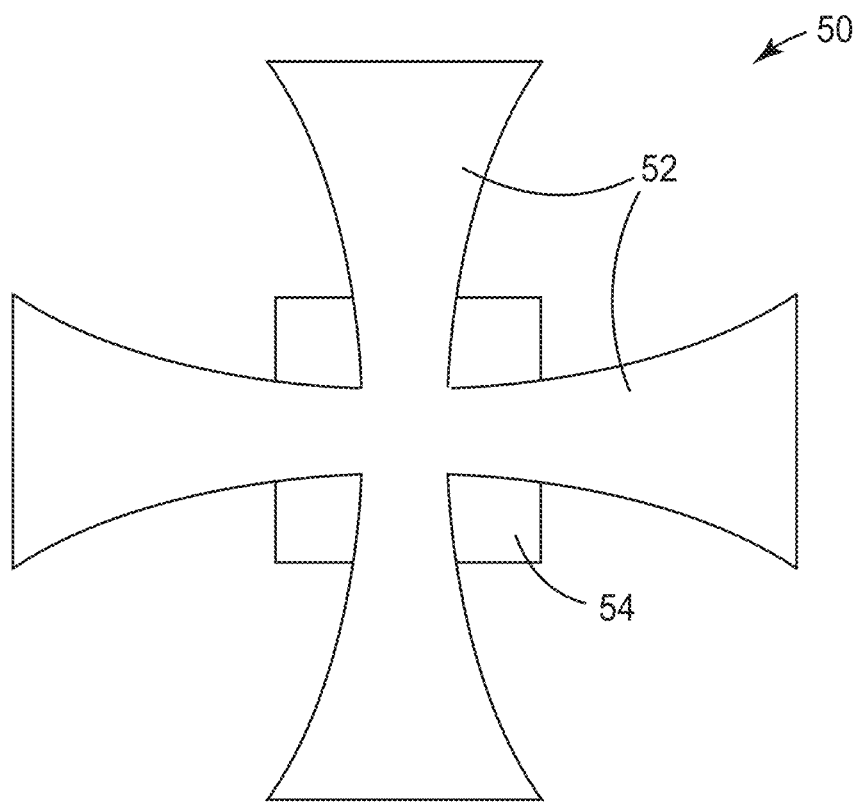
FIGS. 5A-5B illustrate shaped microparticles in accordance with various embodiments.
Figure 5B:
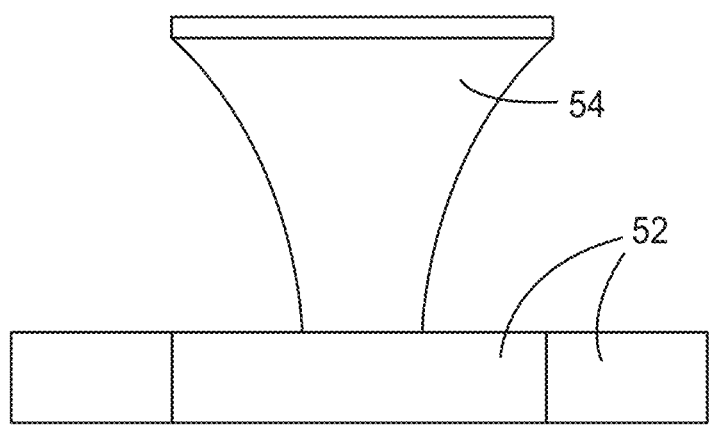

FIGS. 5A-5B illustrate shaped microparticles in accordance with various embodiments. Embodiments and Examples described herein illustrate the improved lifetime performance obtained when coating shaped abrasive particles with particles having an aspect ratio higher than 1. It is believed that the improved performance results from the higher surface area of microparticles available to bond with both the shaped abrasive particles and the resin matrix. Therefore, it is expressly contemplated that similar results may also be seen with shaped microparticles with increased surface areas. One such particle is illustrated in FIGS. 5A and 5B. FIG. 5A illustrates a particle 50 with several faceted arms 52 that are substantially planar with one another. FIG. 5B illustrates a side view, illustrating the arrangement between planar arms 52 and an additional perpendicularly positioned arm 54. However, while FIGS. 5A and 5B illustrate one example of a shaped microparticle, others are possible. For example, rods, crosses, tetrahedra, 2-dimensional plates and joined combinations of those shapes.

Figure 6A:
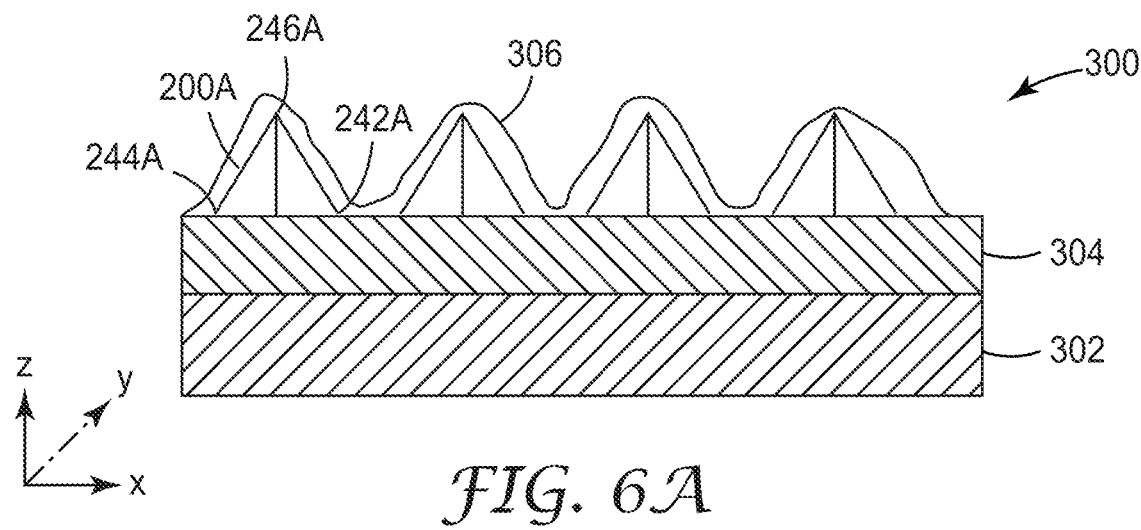
FIGS. 6A and 6B are sectional views of coated abrasive articles, in accordance with various embodiments.

FIG. 6A is a sectional view of coated abrasive article 300. Coated abrasive article 300 includes backing 302 defining a surface along an x-y direction. Backing 302 has a first layer of binder, hereinafter referred to as make coat 304, applied over a first surface of backing 302. Attached or partially embedded in make coat 304 are a plurality of shaped abrasive particles 200A. Although shaped abrasive particles 200A are shown any other shaped abrasive particle described herein can be included in coated abrasive article 300. An optional second layer of binder, hereinafter referred to as size coat 306, is dispersed over shaped abrasive particles 200A. As shown, a major portion of shaped abrasive particles 200A have at least one of three vertices (240, 242, and 244) oriented in substantially the same direction. Thus, shaped abrasive particles 200A are oriented according to a non-random distribution, although in other embodiments any of shaped abrasive particles 200A can be randomly oriented on backing 302. In some embodiments, control of a particle's orientation can increase the cut of the abrasive article. The shaped abrasive particles 200A comprise a microparticulate layer (not shown) disposed on at least a portion of the outer surface of the abrasive particles (e.g., faces formed by vertices 240, 242, and 244), wherein the microparticulate layer comprises microparticles dispersed in a binder.

Backing 302 can be flexible or rigid. Examples of suitable materials for forming a flexible backing include a polymeric film, a metal foil, a woven fabric, a knitted fabric, paper, vulcanized fiber, a staple fiber, a continuous fiber, a nonwoven, a foam, a screen, a laminate, and combinations thereof. Backing 302 can be shaped to allow coated abrasive article 300 to be in the form of sheets, discs, belts, pads, or rolls. In some embodiments, backing 302 can be sufficiently flexible to allow coated abrasive article 300 to be formed into a loop to make an abrasive belt that can be run on suitable grinding equipment.

Make coat 304 secures shaped abrasive particles 200A to backing 302, and size coat 306 can help to reinforce shaped abrasive particles 200A. Make coat 304 and/or size coat 306 can include a resinous adhesive. The resinous adhesive can include one or more resins chosen from a phenolic resin, an epoxy resin, a urea-formaldehyde resin, an acrylate resin, an aminoplast resin, a melamine resin, an acrylated epoxy resin, a urethane resin, a polyester resin, a dying oil, and mixtures thereof.

Figure 6B:
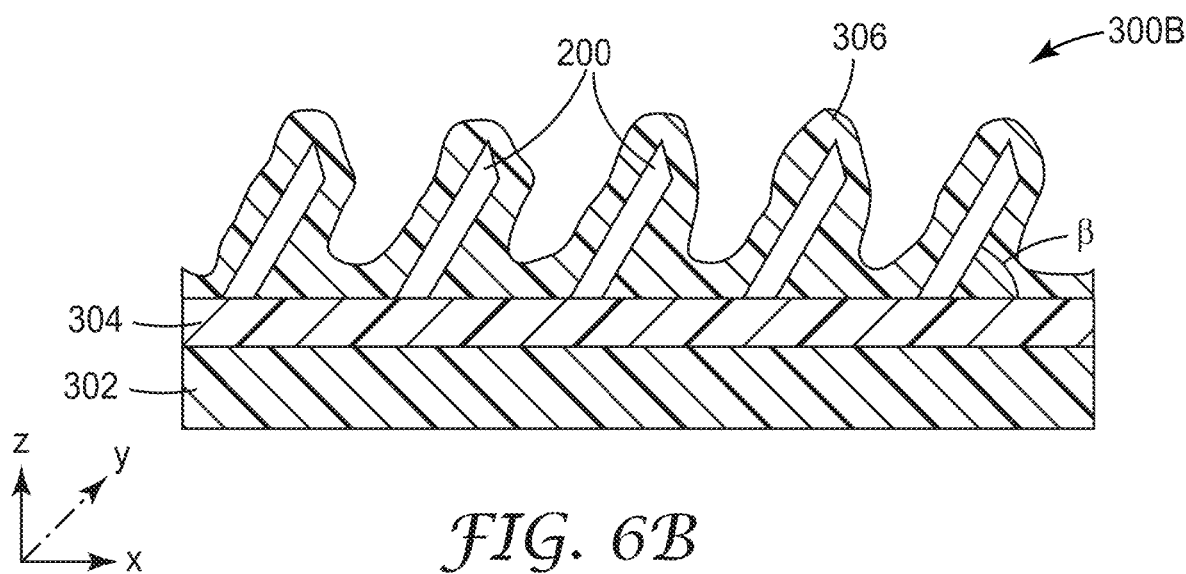

FIG. 6B shows an example of coated abrasive article 300B, which includes shaped abrasive particles 200 instead of shaped abrasive particles 300. As shown, shaped abrasive particles 200 are attached to backing 302 by make coat 304 with size coat 306 applied to further attach or adhere shaped abrasive particles 200 to the backing 302. As shown in FIG. 3B, the majority of the shaped abrasive particles 200 are tipped or leaning to one side. This results in the majority of shaped abrasive particles 200 having an orientation angle β less than 90 degrees relative to backing 302.

Bonded abrasive articles are also contemplated herein. Methods for preparing bonded abrasive articles generally include: a press-molding process including the steps of coating mainly powdery raw material of the bond onto abrasive grains, charging abrasive grains into a mold and press-molding the charged material; and a casting process including the steps of blending a resin (e.g., liquid resin) and abrasive grains in a mixer, and casting the blend into a mold in a wet state.

Figure 7A:
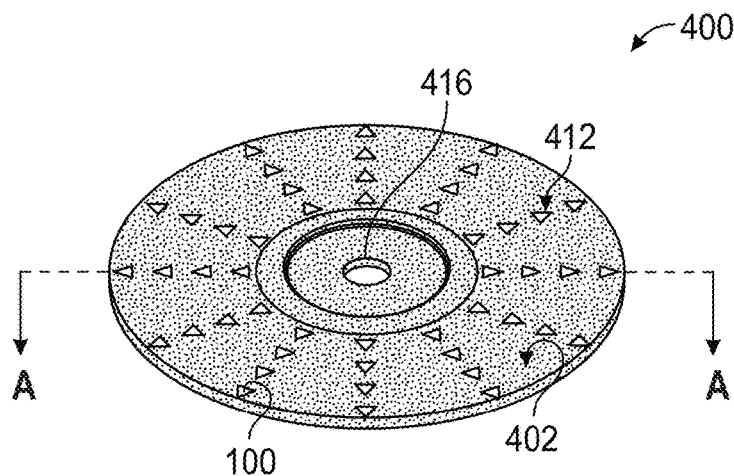
FIGS. 7A-7B are perspective and sectional views of a bonded abrasive article, in accordance with various embodiments.
Figure 7B:
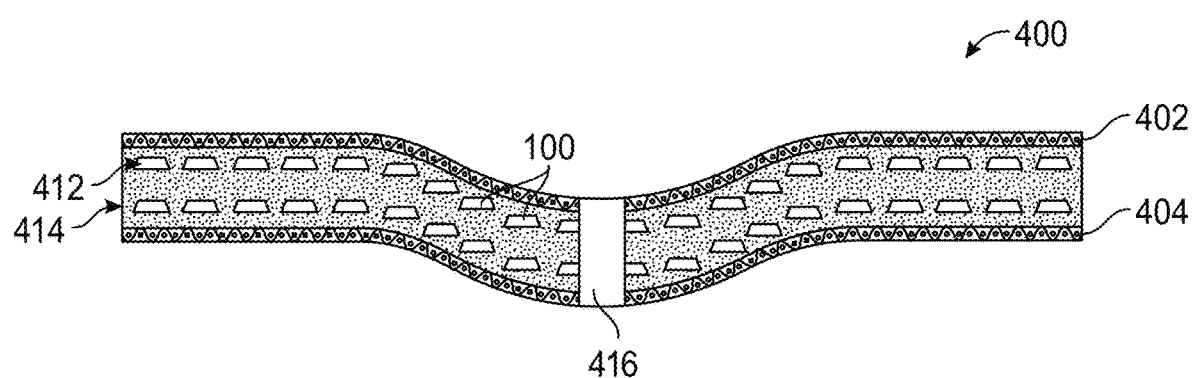

FIGS. 7A and 7B show an example of bonded abrasive article 400. Specifically, FIG. 7A is a perspective view of bonded abrasive article 400 and FIG. 7B is a sectional view of bonded abrasive article 400 taken along line A-A of FIG. 7A. FIGS. 4A and 7B show many of the same features and are discussed concurrently. As depicted, bonded abrasive article 400 is a depressed center grinding wheel. In other examples, the bonded abrasive article can be a mounted point, a cut-off wheel, a cut-and-grind wheel, a depressed center grinding wheel, a depressed center cut-off wheel, a reel grinding wheel, a mounted point, a tool grinding wheel, a roll grinding wheel, a hot-pressed grinding wheel, a face grinding wheel, a rail grinding wheel, a grinding cone, a grinding plug, a cup grinding wheel, a gear grinding wheel, a centerless grinding wheel, a cylindrical grinding wheel, an inner diameter grinding wheel, an outer diameter grinding wheel or a double disk grinding wheel.

The dimensions of the wheel can be any suitable size for example the diameter can range from 2 mm to about 2000 mm, about 500 mm to about 1000 mm, or less than, equal to, or greater than about 2 mm, 50, 100, 200, 300, 400, 500, 600, 700, 800, 900, 1000, 1100, 1200, 1300,1400, 1500, 1600, 1700, 1800, 1900, about 2000 mm; 2 mm to 2,000 mm, 5 mm 1,000 mm or 20 mm 500 mm.

Bonded abrasive article 400 includes first major surface 402 and second major surface 404. The first major surface and the second major surface have a substantially circular profile. Central aperture 416 extends between first major surface 402 and second major surface 404 and can be used, for example, for attachment to a power driven tool. In examples of other abrasive articles, central aperture 416 can be designed to only extend partially between first and second major surfaces 402 and 404. Bonded abrasive article 400 can be formed from a number of different components.

Although shaped abrasive particles 100 are shown other embodiments of bonded abrasive article 400 can include shaped abrasive particles 200A-200E. The particles present in bonded abrasive article 400 are retained in a binder. As described herein the binder can be an organic resin, a vitreous binder, or a metallic binder. In some examples, the binder can include abrasive particles distributed therein. Suitable organic binders are those that can be cured (e.g., polymerized and/or crosslinked) to form useful organic binders. These binders include, for example, one or more phenolic resins (including novolac and/or resole phenolic resins), one or more epoxy resins, one or more urea-formaldehyde binders, one or more polyester resins, one or more polyimide resins, one or more rubbers, one or more polybenzimidazole resins, one or more shellacs, one or more acrylic monomers and/or oligomers, and combinations thereof. The organic binder precursor(s) may be combined with additional components such as, for example, curatives, hardeners, catalysts, initiators, colorants, antistatic agents, grinding aids, and lubricants.

Useful phenolic resins include novolac and resole phenolic resins. Novolac phenolic resins are characterized by being acid-catalyzed and as having a ratio of formaldehyde to phenol of less than one, for example, between 0.5:1 and 0.8:1. Resole phenolic resins are characterized by being alkaline catalyzed and having a ratio of formaldehyde to phenol of greater than or equal to one, for example from 1:1 to 3:1. Novolac and resole phenolic resins may be chemically modified (e.g., by reaction with epoxy compounds), or they may be unmodified. Exemplary acidic catalysts suitable for curing phenolic resins include sulfuric, hydrochloric, phosphoric, oxalic, and p-toluenesulfonic acids. Alkaline catalysts suitable for curing phenolic resins include sodium hydroxide, barium hydroxide, potassium hydroxide, calcium hydroxide, organic amines, or sodium carbonate.

Phenolic resins are well-known and readily available from commercial sources. Examples of commercially available novolac resins include DUREZ 1364, a two-step, powdered phenolic resin (marketed by Durez Corporation, Addison, Tex., under the trade designation VARCUM (e.g., 29302), or DURITE RESIN AD-5534 (marketed by Hexion, Inc., Louisville, KY). Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co., Bartow, Fla. under the trade designation AEROFENE (e.g., AEROFENE 295); and those marketed by Kangnam Chemical Company Ltd., Seoul, South Korea under the trade designation "PHENOLITE" (e.g., PHENOLITE TD-2207).

With regards to vitrified binding materials, vitreous bonding materials, which exhibit an amorphous structure and are hard, are well known in the art. In some cases, the vitreous bonding material includes crystalline phases. Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Vitreous bonding materials can be formed from a composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in the range from about 700° C. to about 1500° C., usually in the range from about 800° C. to about 1300° C., sometimes in the range from about 900° C. to about 1200° C., or even in the range from about 950° C. to about 1100° C. The actual temperature at which the bond is matured depends, for example, on the particular bond chemistry. Preferred vitrified bonding materials may include those comprising silica, alumina (preferably, at least 10 percent by weight alumina), and boria (preferably, at least 10 percent by weight boria). In most cases the vitrified bonding materials further comprise alkali metal oxide(s) (e.g., $Na_2O$ and $K_2O$) (in some cases at least 10 percent by weight alkali metal oxide(s)).

Shaped abrasive particles 100 can be arranged in a plurality of layers. For example, as shown in FIGS. 7A and 7B bonded abrasive article 400 includes first layer of shaped abrasive particles 412 and second layer of shaped abrasive particles 414. First layer of shaped abrasive particles 412 and the second layer of shaped abrasive particles 414 are spaced apart from one another with the binder located therebetween. Although two layers are shown, bonded abrasive article 400 can include additional layers of shaped abrasive particles 100. For example, bonded abrasive article 400 can include a third layer of shaped abrasive particles 100 adjacent to at least one of the first or second layers of triangular abrasive particles 412 and 414. Any of layers 412 and 414 can include crushed abrasive particles, ceramic crushed abrasive particles, or ceramic shaped abrasive particles.

Although shaped abrasive particles 100, can be randomly distributed it is also possible to distribute shaped abrasive particles 100 according to a predetermined pattern. For example, FIG. 7A shows a pattern where adjacent shaped abrasive particles 100 of first layer 412 are directly aligned with each other in rows extending from central aperture 416 to the perimeter of bonded abrasive article 400. Adjacent shaped abrasive particles 100 are also directly aligned in concentric circles. Alternatively, adjacent shaped abrasive particles 100 can be staggered with respect to each other. Additional predetermined patterns of shaped abrasive particles 100 are also within the scope of this disclosure. For example, shaped abrasive particles 100 can be arranged in a pattern that forms a word or image. Shaped abrasive particles 100 can also be arranged in a pattern that forms an image when bonded abrasive article 400 is rotated at a predetermined speed. In addition to, or instead of, shaped abrasive particles 100 being arranged in a predetermined pattern, other particles such as filler particles can also be arranged in a predetermined pattern as described with respect to the abrasive particles.

Any of the abrasive articles described herein, including abrasive article 300 or 400, can also include conventional (e.g., crushed) abrasive particles. Examples of useful abrasive particles include fused aluminum oxide-based materials such as aluminum oxide, ceramic aluminum oxide (which can include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and mixtures thereof.

The conventional abrasive particles can, for example, have an average diameter ranging from about 10 µm to about 5000 µm, about 20 µm to about 2000 µm, about 50 µm to about 1000 µm, less than, equal to, or greater than about 10 µm, 20, 30, 40, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1650, 1700, 1750, 1800, 1850, 1900, 1950, or 2000 µm. For example, the conventional abrasive particles can have an abrasives industry-specified nominal grade. Such abrasives industry-accepted grading standards include those known as the American National Standards Institute, Inc. (ANSI) standards, Federation of European Producers of Abrasive Products (FEPA) standards, and Japanese Industrial Standard (HS) standards. Exemplary ANSI grade designations (e.g., specified nominal grades) include: ANSI 12 (1842 µm), ANSI 16 (1320 µm), ANSI 20 (905 µm), ANSI 24 (728 µm), ANSI 36 (530 µm), ANSI 40 (420 µm), ANSI 50 (351 µm), ANSI 60 (264 µm), ANSI 80 (195 µm), ANSI 100 (141 µm), ANSI 120 (116 µm), ANSI 150 (93 µm), ANSI 180 (78 µm), ANSI 220 (66 µm), ANSI 240 (53 µm), ANSI 280 (44 µm), ANSI 320 (46 µm), ANSI 360 (30 µm), ANSI 400 (24 µm), and ANSI 600 (16 µm). Exemplary FEPA grade designations include P12 (1746 µm), P16 (1320 µm), P20 (984 µm), P24 (728 µm), P30 (630 µm), P36 (530 µm), P40 (420 µm), P50 (326 µm), P60 (264 µm), P80 (195 µm), P100 (156 µm), P120 (127 µm), P120 (127 µm), P150 (97 µm), P180 (78 µm), P220 (66 µm), P240 (60 µm), P280 (53 µm), P320 (46 µm), P360 (41 µm), P400 (36 µm), P500 (30 µm), P600 (26 µm), and P800 (22 µm). An approximate average particles size of reach grade is listed in parenthesis following each grade designation.

Shaped abrasive particles 100 or 200 or crushed abrasive particles can include any suitable material or mixture of materials. For example, shaped abrasive particles 100 can include a material chosen from an alpha-alumina, a fused aluminum oxide, a heat-treated aluminum oxide, a ceramic aluminum oxide, a sintered aluminum oxide, a silicon carbide, a titanium diboride, a boron carbide, a tungsten carbide, a titanium carbide, a diamond, a cubic boron nitride, a garnet, a fused alumina-zirconia, a sol-gel derived abrasive particle, a cerium oxide, a zirconium oxide, a titanium oxide, and combinations thereof. In some embodiments, shaped abrasive particles 100 or 200 and crushed abrasive particles can include the same materials. In further embodiments, shaped abrasive particles 100 or 200 and crushed abrasive particles can include different materials.

Filler particles can also be included in abrasive articles 200 or 300. Examples of useful fillers include metal carbonates (such as calcium carbonate, calcium magnesium carbonate, sodium carbonate, magnesium carbonate), silica (such as quartz, glass beads, glass bubbles and glass fibers), silicates (such as talc, clays, montmorillonite, feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, sugar, wood flour, a hydrated aluminum compound, carbon black, metal oxides (such as calcium oxide, aluminum oxide, tin oxide, titanium dioxide), metal sulfites (such as calcium sulfite), thermoplastic particles (such as polycarbonate, polyetherimide, polyester, polyethylene, poly (vinylchloride), polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles and the like). The filler may also be a salt such as a halide salt. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metal fillers include, tin, lead, bismuth, cobalt, antimony, cadmium, iron and titanium. Other miscellaneous fillers include sulfur, organic sulfur compounds, graphite, lithium stearate and metallic sulfides. In some embodiments, individual shaped abrasive particles 100 or individual crushed abrasive particles can be at least partially coated with an amorphous, ceramic, or organic coating. Examples of suitable components of the coatings include, a silane, glass, iron oxide, aluminum oxide, or combinations thereof. Coatings such as these can aid in processability and bonding of the particles to a resin of a binder.

Abrasive article 400 can be formed according to any suitable method. One method includes retaining a first plurality of shaped abrasive particles 100 within a first portion of the plurality of holes 502 of apparatus 500. Apparatus 500 can be positioned within a mold and the first plurality of shaped abrasive particles 100 are released in the mold. Binder material is then deposited to form a mixture of shaped abrasive particles 100 and binder material. The mold can then be heated to form the abrasive article.

The first portion of the plurality of holes 502 can range from about 5% to about 100% of the total amount of holes 502 of apparatus 500, or from about 30% to about 60%, or less than about, equal to about, or greater than about 10%, 15, 20, 25, 30, 35, 40, 45, 50, 55, 60, 65, 70, 75, 80, 85, 90, or 95%. In examples where the first portion of the plurality of holes 502 is less than 100%, a second plurality of shaped abrasive particles 100 can be retained within a second portion of the plurality of holes of the apparatus. The second portion of the plurality of holes 502 can range from about 5% to about 99% of the total amount of holes of the apparatus, or from about 30% to about 60%, or less than about, equal to about, or greater than about 10%, 15, 20, 25, 30, 35, 40, 45, 50, 55, 60, 65, 70, 75, 80, 85, 90, or 95%.

Figure 8:
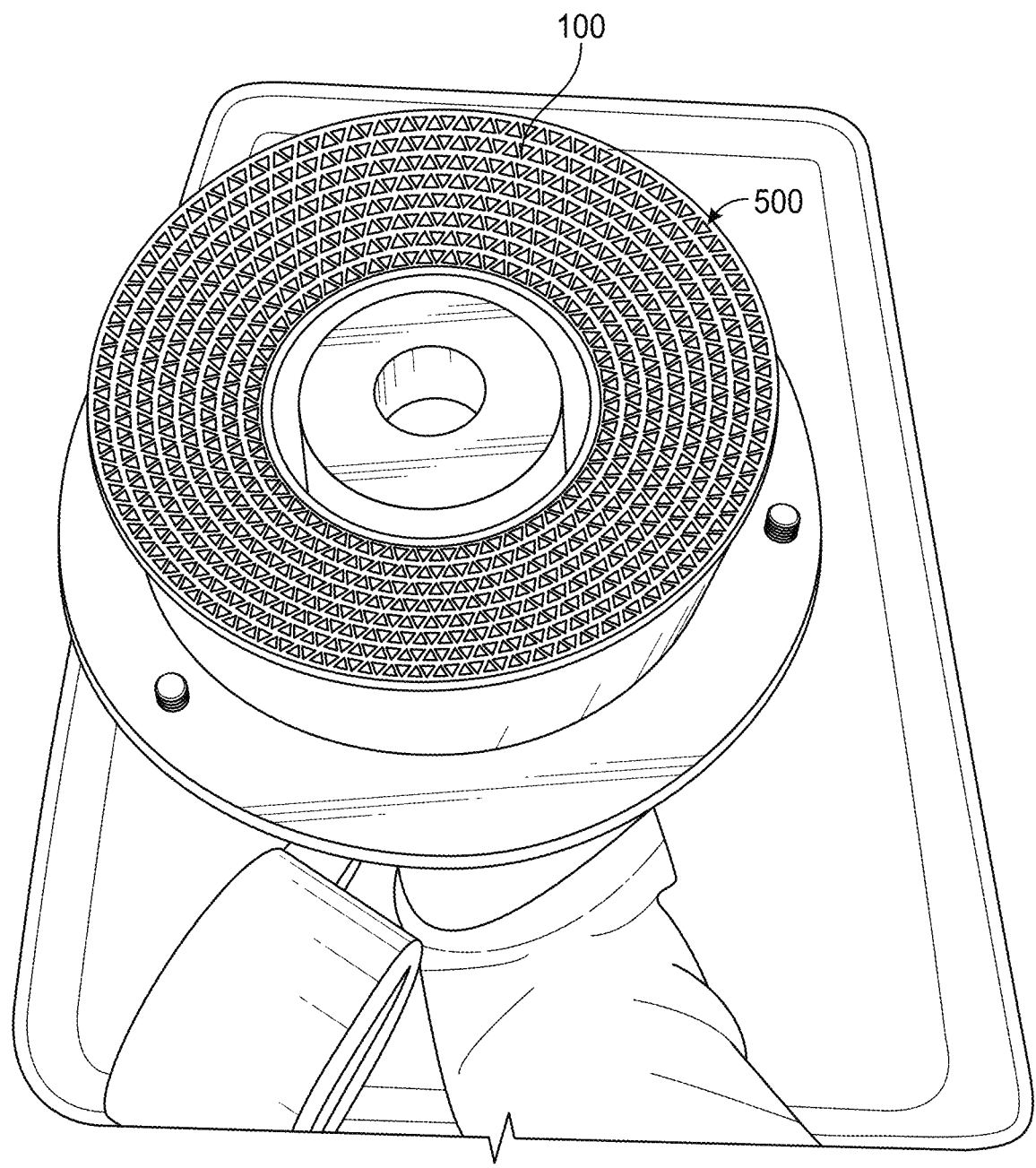
FIGS. 8-10 are perspective views showing various stages of forming a bonded abrasive article, in accordance with various embodiments.

FIG. 8 is a perspective view showing the apparatus in which a first plurality of shaped abrasive particles 100 is contacting the apparatus first major surface. Shaped abrasive particles 100 can be contacted with the apparatus first major surface by pouring the particles 100 over the apparatus or by immersing the apparatus in the abrasive particles.

The vacuum generation system is engaged after a majority (e.g., around 95%) of holes 502 of the apparatus are filled with abrasive particles 100 the vacuum generation system is engaged. This results in the pressure inside the housing being decreased. FIG. 8 is a perspective view showing shaped abrasive particles 100 retained in the holes of the apparatus once the vacuum is engaged. Alternatively the particles 100 could be retained through activation of a magnet within the housing.

Figure 9:
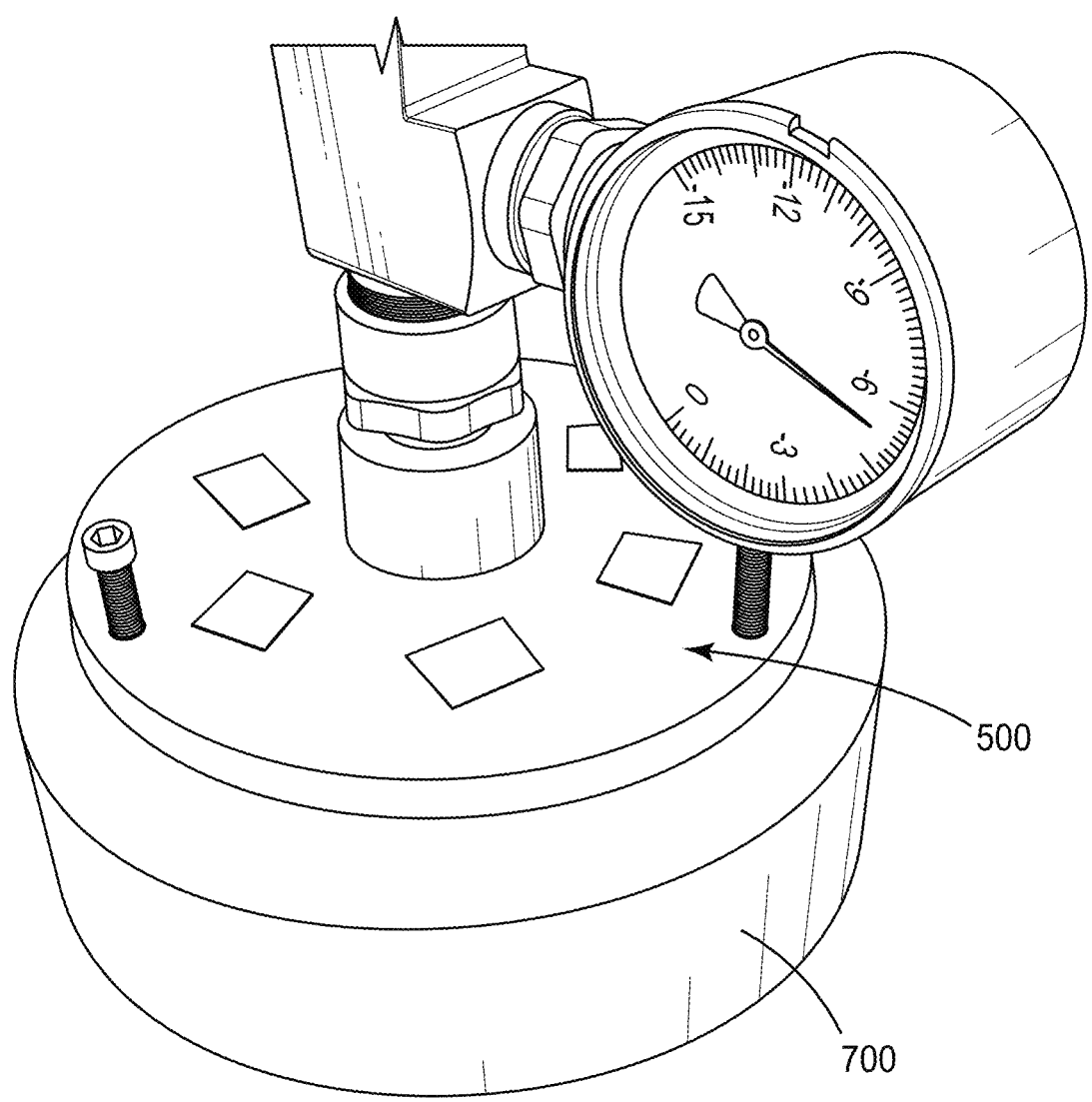
Figure 10:
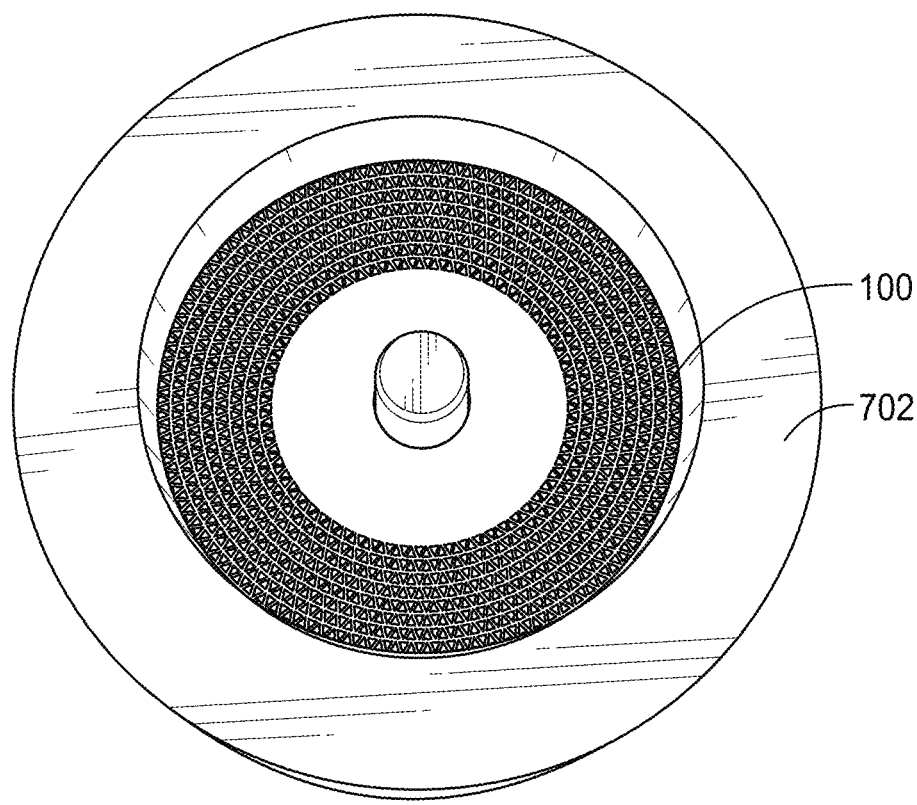

FIG. 9 is a perspective view showing apparatus 500 positioned within mold 700. Once the apparatus is adequately positioned within mold 700 abrasive particles 100 are released. The release of abrasive particles 100 can be accomplished by increasing the pressure within the housing or disengaging the magnet. A majority of abrasive particles 100 are released into mold 700 upon the increase in pressure or disengagement of the magnet. The particles can be released substantially simultaneously or over a time period ranging up to about 10 seconds. FIG. 10 is a perspective view showing abrasive particles 100 in mold after release. Upon release, abrasive particles 100 contact any binder material predisposed in the mold 700. If there is no binder material in mold 700, then binder material can be added after abrasive particles 100 or 200 are deposited in mold 700. The abrasive particles and the binder form a mixture. The mixture can optionally be pressed.

Because at least a majority of holes 502 in apparatus 500 are arranged in a predetermined pattern at least a majority of abrasive particles 100 are deposited in mold 700 in a predetermined pattern. Thus, to form a predetermined pattern of abrasive particles 100, it is not necessary to attach the particles to a reinforcing layer such as a scrim or to arrange the particles in a scaffold structure that is incorporated into the abrasive article. Additional layers of abrasive particles can be formed by reloading the apparatus and depositing additional layers of abrasive particles in the mold on top of a previously deposited layer of abrasive particles.

After the desired amount of layers of abrasive particles 100 are deposited in mold 700, the mixture is cured by heating at, for example, temperatures ranging from about 70° C. to about 200° C. The mixture is heated for a sufficient time to cure the curable phenolic resins. For example, suitable times can range from about 2 hours to about 40 hours. Curing can also be done in a stepwise fashion; for example, the wheel can be heated to a first temperature ranging from about 70° C. to about 95° C. for a time ranging from about 2 hours to about 40 hours. The mixture can then be heated at a second temperature ranging from about 100° C. to about 125° C. for a time ranging from about 2 hours to about 40 hours. The mixture can then be heated at a third temperature ranging from about 140° C. to about 200° C. for a time ranging from about 2 hours to about 10 hours. The mixture can be cured in the presence of air. Alternatively, to help preserve any color, the wheel can be cured at a higher temperature (e.g., greater than 140° C.) under nitrogen where the concentration of oxygen is relatively low.

As shown in FIGS. 6A and 6B each of the plurality of shaped abrasive particles 100 or 200 can have a specified z-direction rotational orientation about a z-axis passing through shaped abrasive particles 100 or 200 and through backing 302 at a 90 degree angle to backing 302. Shaped abrasive particles 100 or 200 are orientated with a surface feature, such as a substantially planar surface particle 100 or 200, rotated into a specified angular position about the z-axis. The specified z-direction rotational orientation abrasive article 300A or 300B occurs more frequently than would occur by a random z-directional rotational orientation of the surface feature due to electrostatic coating or drop coating of the shaped abrasive particles 100 or 200 when forming the abrasive article 300A or 300B. As such, by controlling the z-direction rotational orientation of a significantly large number of shaped abrasive particles 100 or 200, the cut rate, finish, or both of coated abrasive article 300A or 300B can be varied from those manufactured using an electrostatic coating method. In various embodiments, at least 50, 51, 55, 60, 65, 70, 75, 80, 85, 90, 95, or 99 percent of shaped abrasive particles 100 or 200 can have a specified z-direction rotational orientation which does not occur randomly and which can be substantially the same for all of the aligned particles. In other embodiments, about 50 percent of shaped abrasive particles 100 or 200 can be aligned in a first direction and about 50 percent of shaped abrasive particles 100 or 200 can be aligned in a second direction. In one embodiment, the first direction is substantially orthogonal to the second direction.

The specific z-direction rotational orientation of formed abrasive particles can be achieved through use of a precision apertured screen that positions shaped abrasive particles 100 or 200 into a specific z-direction rotational orientation such that shaped abrasive particle 100 or 200 can only fit into the precision apertured screen in a few specific orientations such as less than or equal to 4, 3, 2, or 1 orientations. For example, a rectangular opening just slightly bigger than the cross section of shaped abrasive particle 100 or 200 comprising a rectangular plate will orient shaped abrasive particle 100 or 200 in one of two possible 180 degree opposed z-direction rotational orientations. The precision apertured screen can be designed such that shaped abrasive particles 100 or 200, while positioned in the screen's apertures, can rotate about their z-axis (normal to the screen's surface when the formed abrasive particles are positioned in the aperture) less than or equal to about 30, 20, 10, 5, 2, or 1 angular degrees.

The precision apertured screen having a plurality of apertures selected to z-directionally orient shaped abrasive particles 100 and 200 into a pattern, can have a retaining member such as adhesive tape on a second precision apertured screen with a matching aperture pattern, an electrostatic field used to hold the particles in the first precision screen or a mechanical lock such as two precision apertured screens with matching aperture patterns twisted in opposite directions to pinch particles 100 and 200 within the apertures. The first precision aperture screen is filled with shaped abrasive particles 100 and 200, and the retaining member is used to hold shaped abrasive particles 100 in place in the apertures. In one embodiment, adhesive tape on the surface of a second precision aperture screen aligned in a stack with the first precision aperture screen causes shaped abrasive particles 100 to stay in the apertures of the first precision screen stuck to the surface of the tape exposed in the second precision aperture screen's apertures.

Following positioning in apertures, coated backing 302 having make layer 304 is positioned parallel to the first precision aperture screen surface containing the shaped abrasive particles 100 or 200 with make layer 304 facing shaped abrasive particles 100 or 200 in the apertures. Thereafter, coated backing 302 and the first precision aperture screen are brought into contact to adhere shaped abrasive particles 100 or 200 to the make layer. The retaining member is released such as removing the second precision aperture screen with taped surface, untwisting the two precision aperture screens, or eliminating the electrostatic field. Then the first precision aperture screen is then removed leaving the shaped abrasive particles 100 or 200 having a specified z-directional rotational orientation on the coated abrasive article 300 for further conventional processing such as applying a size coat and curing the make and size coats.

Another way to form abrasive article 300 in which shaped abrasive particles 100 or 200 have a specified z-direction rotational angle is use magnetic alignment. FIG. 8 shows web 810 comprising backing 815 having make layer precursor 820 disposed thereon, which moves along web path 812 in a downweb direction 814 (e.g., machine direction). Web 810 has a crossweb direction (not shown) that is perpendicular to downweb direction 814. Make layer precursor 820 includes a first curable binder precursor (not shown). Magnetizable particles 832 (having a structure corresponding to shaped abrasive particles 100 or 200) are dropped through a portion of applied magnetic field 840 onto make layer precursor 820. At least some of magnetizable particles 832 are abrasive particles. Magnetizable particles 832 are predominantly deposited onto web 810 after travelling down downward sloping dispensing surface 885, which is fed from hopper 875. While travelling down downward sloping dispensing surface 885 the longest edge magnetizable abrasive particles 832 tends to align with applied magnetic field 840. Various web handling components 880 (e.g., rollers, conveyor belts, feed rolls, and take up rolls) handle web 810.

Throughout the method, at least until transfer of the magnetizable abrasive particles 832 to the make precursor layer 820, magnetizable particles 832 are continuously oriented by the applied magnetic field with their longest axis being aligned substantially parallel (or antiparallel) with the magnetic field lines 865. Once transferred, the applied magnetic field may continue to exert an orienting influence on the magnetizable abrasive particles 832, although this is not requirement.

In general, applied magnetic fields used in practice of the present disclosure have a field strength in the region of the magnetizable particles being affected (e.g., attracted and/or oriented) of at least about 10 gauss (1 mT), at least about 100 gauss (10 mT), or at least about 1000 gauss (0.1 T), although this is not a requirement.

The applied magnetic field can be provided by one or more permanent magnets and/or electromagnet(s), or a combination of magnets and ferromagnetic members, for example. Suitable permanent magnets include rare-earth magnets comprising magnetizable materials are described hereinabove. The applied magnetic field can be static or variable (e.g., oscillating). The upper and/or lower magnetic members (852, 854), each having north (N) and south(S) poles, may be monolithic or they may be composed of multiple component magnets (854A, 854B) and/or magnetizable bodies, for example. If comprised of multiple magnets, the multiple magnets in a given magnetic member can be contiguous and/or co-aligned (e.g., at least substantially parallel) with respect to their magnetic field lines where the components magnets closest approach each other. Stainless steel retainers 856, 858A, and 858B retain the magnets in position. While stainless steel 304 or an equivalent is suitable due to its non-magnetic character, magnetizable materials may also be used. Mild steel mounts 862, 864 support the stainless steel retainers 856, 858A and 858B, respectively. While steel mounts are shown in FIG. 11 the mounts may be made of any dimensionally stable material(s) whether magnetizable or not.

The downward sloping dispensing surface may be inclined at any suitable angle, provided that the magnetizable particles 832 can travel down the surface and be dispensed onto the web. Suitable angles may be in a range of from 15 to 60 degrees, although other angles may also be used. In some instances, it may be desirable to vibrate the downward sloping dispensing surface to facilitate particle movement. The downward sloping dispensing surface may be constructed of any dimensionally stable material that may be non-magnetizable. Examples include: metals such as aluminum; wood; and plastic.

Figure 11:
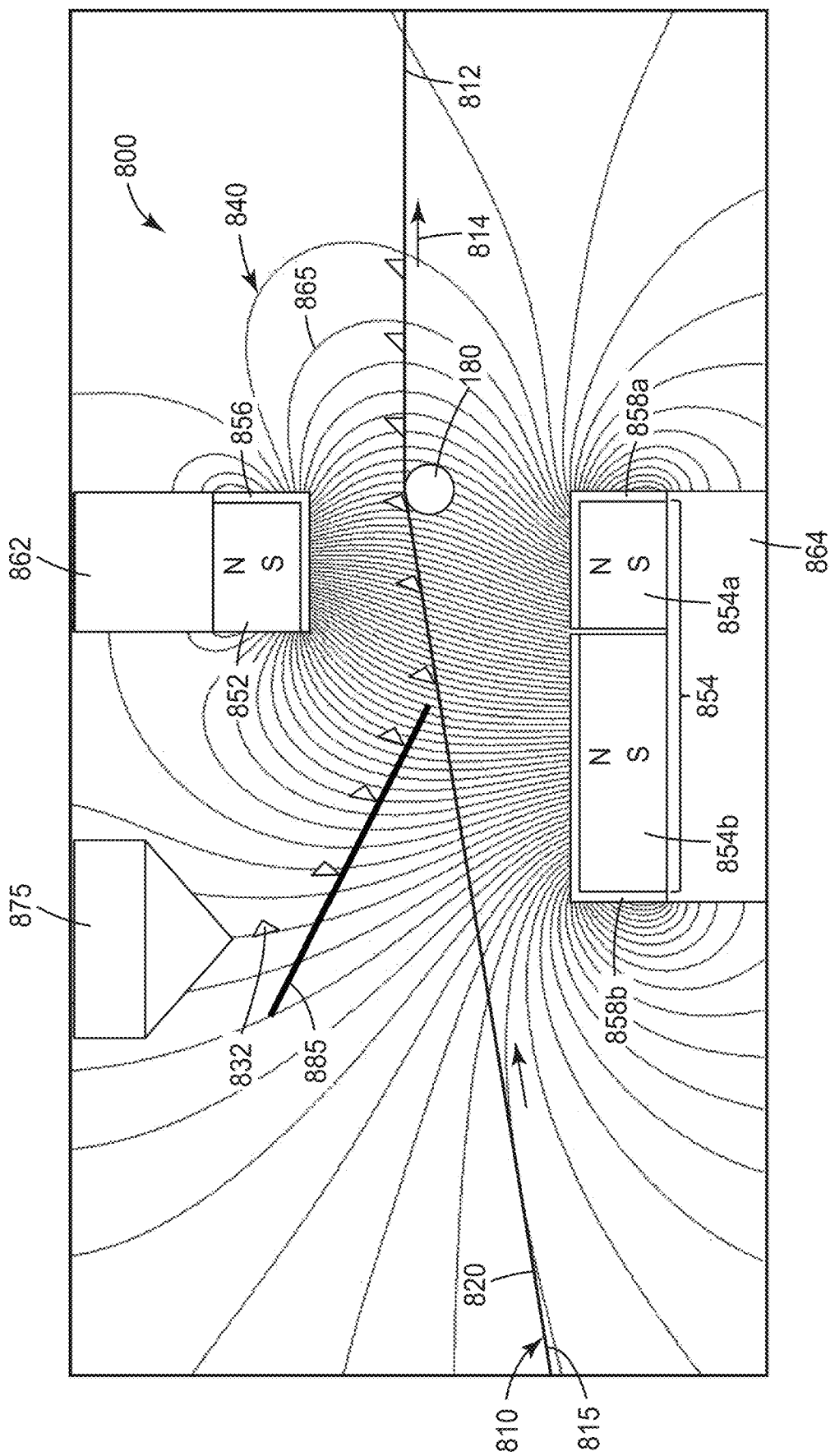
FIG. 11 is schematic diagram showing a method of making an abrasive article, in accordance with various embodiments.
Figure 12:
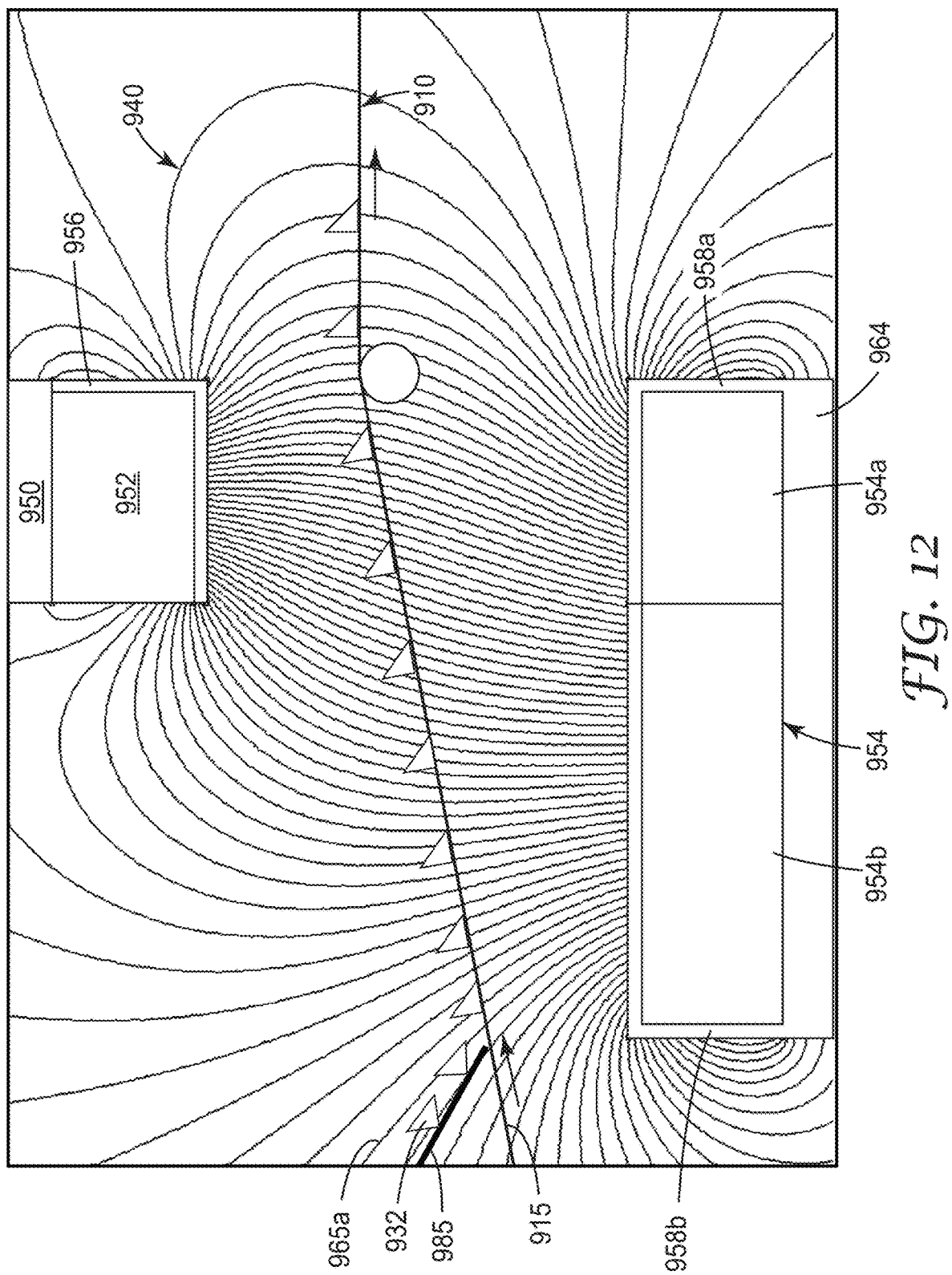
FIG. 12 is a schematic diagram showing a method of orienting a shaped abrasive particle according to the method of FIG. 11, in accordance with various embodiments.
Figure 13:
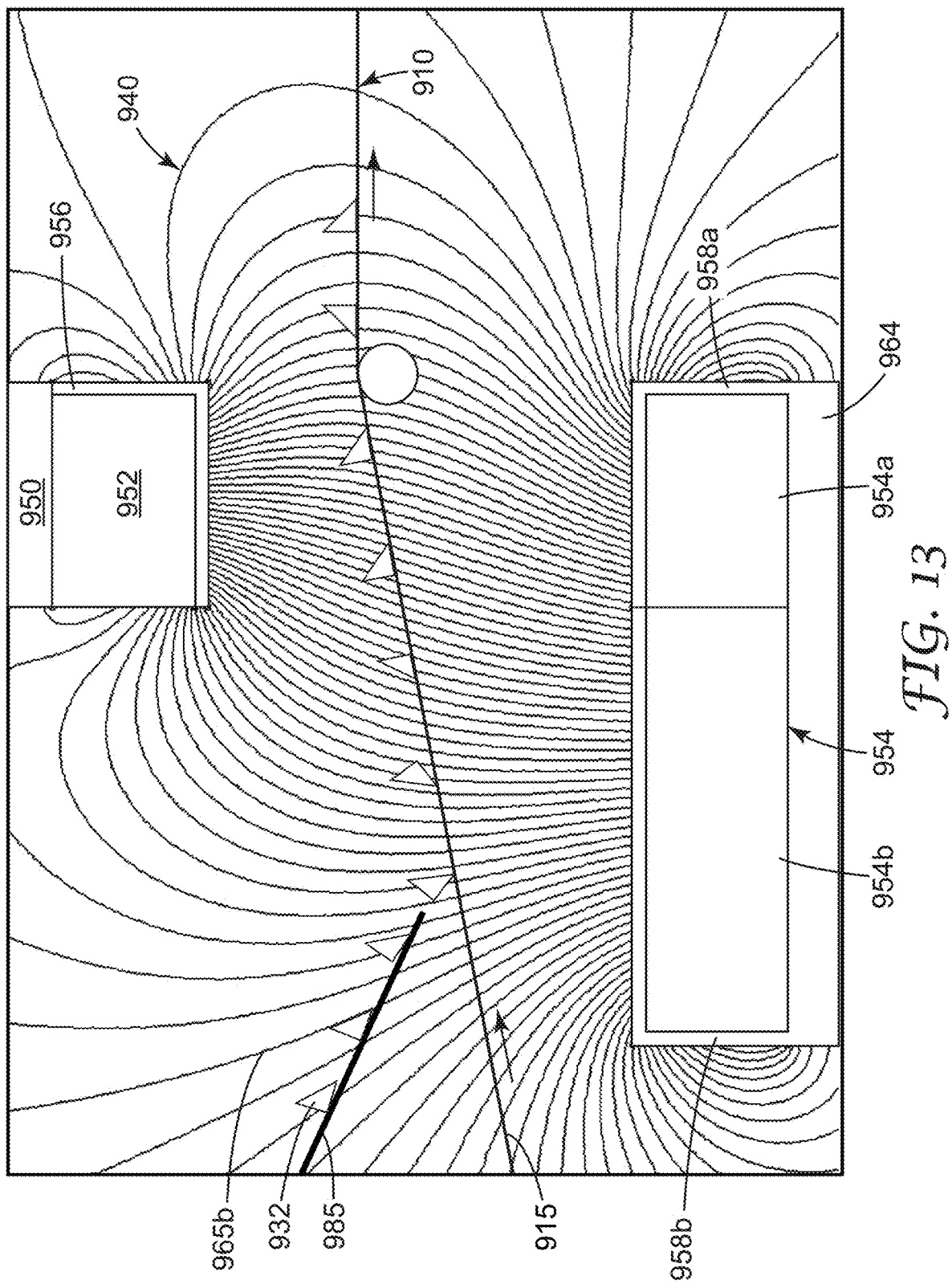
FIG. 13 is a schematic diagram showing a method of orienting of a shaped abrasive particle according to the method of FIG. 11, in accordance with various embodiments.
Figure 14:
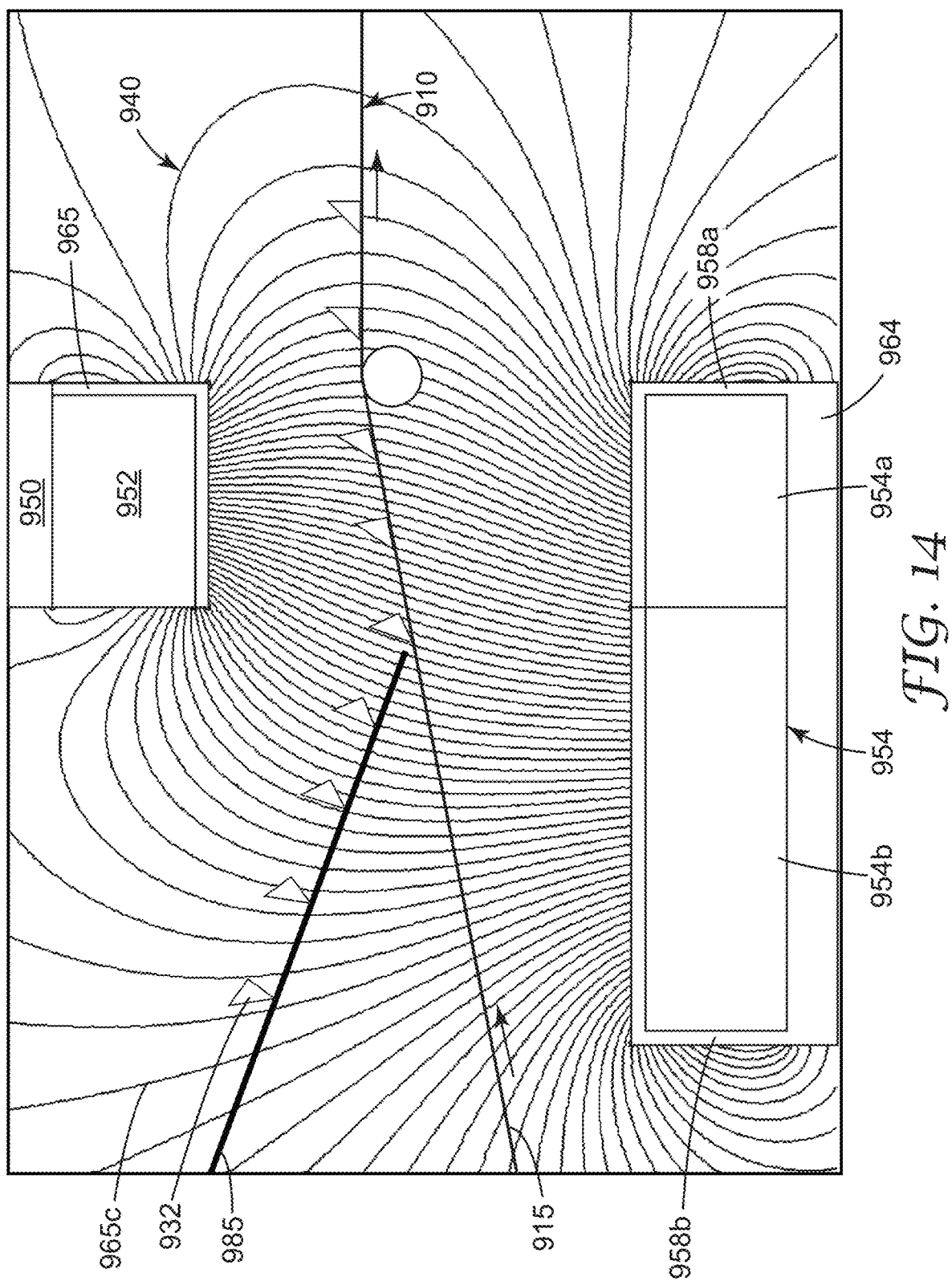
FIG. 14 is a schematic diagram is a schematic diagram showing a method of orienting a shaped abrasive particle according to the method of FIG. 11, in accordance with various embodiments.

FIGS. 12-14 depict the general process in FIG. 11 showing the alignment of the magnetizable particles 832 at the location of transfer from downward sloping dispensing surface 885 onto web 810 depending on the position of downward sloping dispensing surface 885 in the applied magnetic field 840.

For example, in the configuration shown in FIG. 10, magnetizable shaped abrasive particles 932 are dispensed onto web 910 where magnetic field lines 965 form downweb angle α with web 910 of less than 90 degrees such that when transferred to the web they attain an orientation with their long edges sloping upward from right to left. As shown, magnetizable shaped abrasive particles 932 slide down downward sloping dispensing surface 985 and begin to orient with their longest edge aligning with magnetic field lines 965. As magnetizable shaped abrasive particles 932 contact make layer precursor 920 of web 910, they are leaning downweb. Gravity and/or the lower magnetic member cause the magnetic shaped abrasive particles to sit down onto make layer precursor 920, and after curing they are subsequently adhered to backing 915. The majority of magnetizable shaped abrasive particles 932 are adhered with a nominal rake angle (e.g., the angle between the backing and the leading edge of a magnetizable shaped abrasive particle in an indicated direction (e.g., upweb or downweb) of about 90 degrees in the upweb direction Referring now to the configuration shown in FIG. 13, magnetizable shaped abrasive particles 932 align such that when transferred to web 910 they attain an orientation with their longest edge sloping upward from either right to left or left to right. As magnetizable shaped abrasive particles 932 slide down downward sloping dispensing surface 985 and begin to orient with their longest edge aligning with magnetic field lines 965. Magnetizable shaped abrasive particles 932 are dispensed onto web 910 where magnetic field lines 965 are approximately perpendicular to web 910. Magnetizable shaped abrasive particles 932 are disposed onto web 910 with their longest edges approximately perpendicular to the backing. This allows the particles to rotate about their longest edge. The lower magnetic member and/or gravity causes magnetizable shaped abrasive particles 932 to sit down onto make layer precursor 920, and after curing they are subsequently adhered to backing 915.

In the configuration shown in FIG. 14, magnetizable shaped abrasive particles 932 align such that when transferred to the web they attain an orientation with their long edges sloping upward from left to right. As magnetizable shaped abrasive particles 932 slide down downward sloping dispensing surface 985, they begin to orient with their longest edge aligning with magnetic field lines 965. Magnetizable shaped abrasive particles 932 are dispensed on backing where magnetic field lines 965 downweb angle β with web 900 of greater than 90 degrees. As the particles contact the web, they are leaning forward in the downweb direction. The lower magnetic member and/or gravity causes magnetizable shaped abrasive particles 932 to sit down onto make layer precursor 920, and after curing they are subsequently adhered to backing 915. A majority of magnetizable shaped abrasive particles 932 become adhered to web 910 with a rake angle of about 90 degrees in the downweb direction.

Once the magnetizable particles are coated on to the curable binder precursor it is at least partially cured at a first curing station (not shown), so as to firmly retain the magnetizable particles in position. In some embodiments, additional magnetizable and/or non-magnetizable particles (e.g., filler abrasive particle and/or grinding aid particles) can be applied to the make layer precursor prior to curing.

In the case of a coated abrasive article, the curable binder precursor comprises a make layer precursor, and the magnetizable particles comprise magnetizable abrasive particles. A size layer precursor may be applied over the at least partially cured make layer precursor and the magnetizable abrasive particles, although this is not a requirement. If present, the size layer precursor is then at least partially cured at a second curing station, optionally with further curing of the at least partially cured make layer precursor. In some embodiments, a supersize layer is disposed on the at least partially cured size layer precursor.

This disclosure also contemplates nonwoven abrasive articles comprising abrasive particles comprising a microparticulate layer disposed on at least a portion of the outer surface of the abrasive particles, wherein the microparticulate layer comprises microparticles dispersed in a binder.

Figure 15:
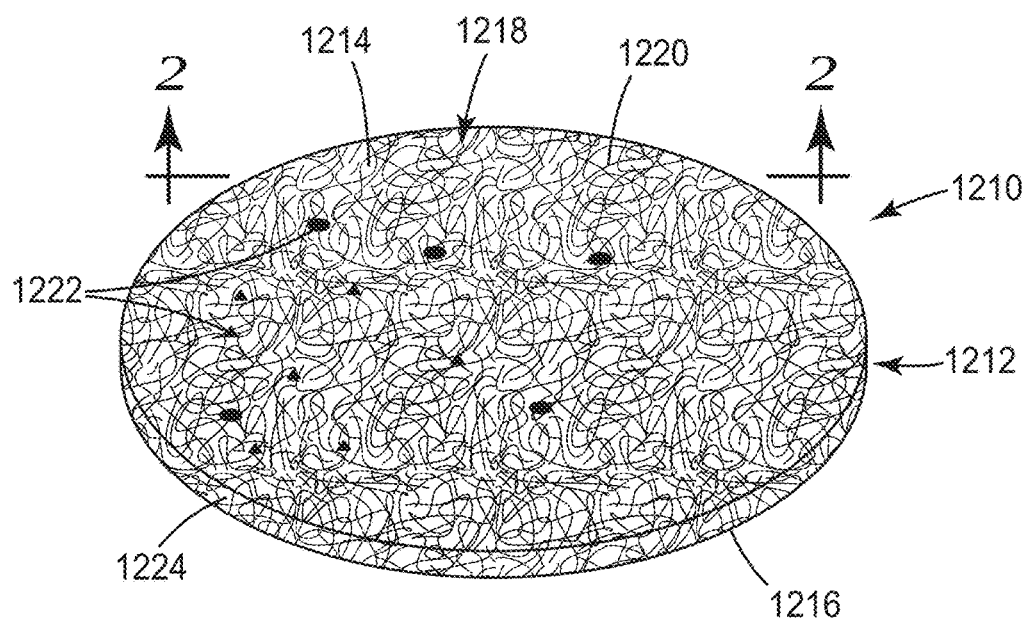
FIG. 15 is a perspective view of a nonwoven abrasive article.
Figure 16:
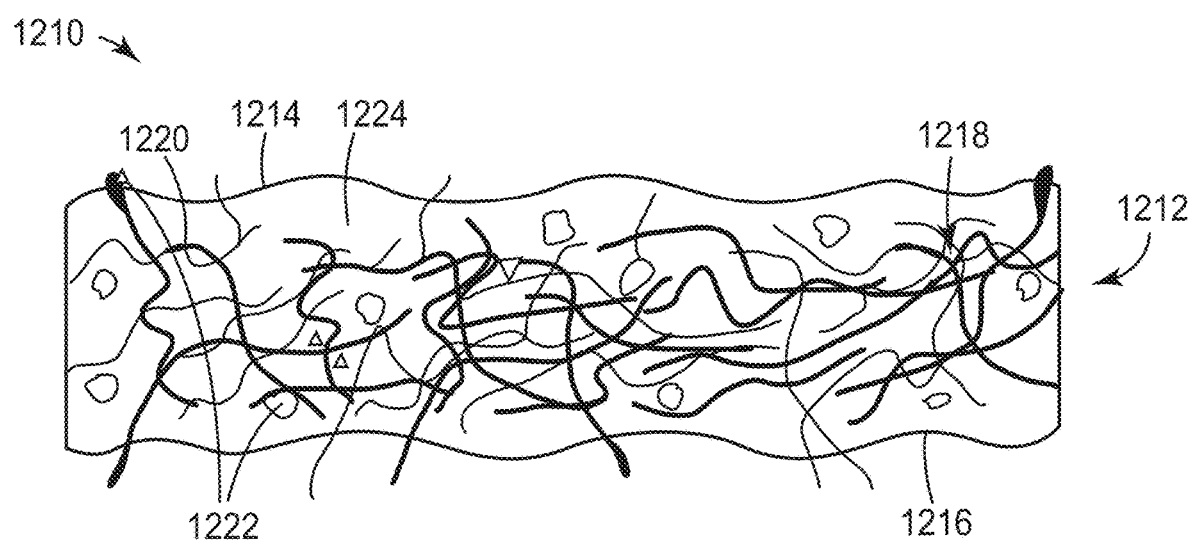
FIG. 16 is a sectional view of the abrasive article of FIG. 15 taken along section line 12-12.

Briefly, FIG. 12 is a perspective view of a nonwoven abrasive article 1210. FIG. 16 is a sectional view of a nonwoven abrasive article of FIG. 12 taken along section line 12-12. FIGS. 1 and 2 show substantially the same components and are discussed concurrently. As shown in FIGS. 15 and 13, the nonwoven abrasive article includes a nonwoven web 1212. The nonwoven web includes first major surface 1214 and opposite second major surface 1216. Each of the first major surface and the second major surface have an irregular or substantially non-planar profile. The nonwoven web includes fiber component 1218, which includes individual fibers 1220. Abrasive particles 1222, which are dispersed throughout the nonwoven web and binder 1224 adheres the abrasive particles to the individual fibers.

While not so limited, the fiber component can range from about 5 wt % to about 30 wt % of the nonwoven abrasive article, about 10 wt % to about 25 wt %, about 10 wt % to about 20 wt %, about 12 wt % to about 15 wt %, less than, equal to, or greater than about 5 wt %, 10, 15, 20, 25, or 30 wt %. The fiber component can include a plurality of individual fibers that are randomly oriented and entangled with respect to each other. The individual fibers are bonded to each other at points of mutual contact. The individual fibers can be staple fibers or continuous fibers. As generally understood, "staple fiber" refers to a fiber of a discrete length and "continuous fiber" refers to a fiber that can be a synthetic filament. The individual fibers can range from about 70 wt % to about 100 wt % of the fiber component, about 80 wt % to about 90 wt %, less than, equal to, or greater than about 70 wt %, 75, 80, 85, 90, 95, or 100 wt % of the fiber component.

The individual staple fibers can have a length ranging from about 35 mm to 155 mm 50 mm to about 105 mm, about 70 mm to about 80 mm, less than, equal to, or greater than about 35 mm, 40, 45, 50, 55, 60, 65, 70, 75, 76, 80, 85, 90, 95, 100, 102, 105, 110, 115, 120, 125, 130, 135, 140, 145, 150, or 155 mm. A crimp index value of the individual staple fibers can range from about 15% to about 60%, about 25% to about 50%, less than, equal to, or greater than about 15%, 20, 25, 30, 35, 40, 45, 50, 55, or 60%. Crimp index is a measurement of a produced crimp; e.g., before appreciable crimp is induced in the fiber. The crimp index is expressed as the difference in length of the fiber in an extended state minus the length of the fiber in a relaxed (e.g., shortened) state divided by the length of the fiber in the extended state. The staple fibers can have a fineness or linear density ranging from about 10 denier to about 2000 denier, about 10 denier to about 200 denier, about 500 denier to about 600 denier, about 500 denier to about 700 denier, about 800 denier to about 1000 denier, about 900 denier to about 1000 denier, less than, equal to, or greater than about 200 denier, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, 2000 denier.

In some examples, the fiber component can include a blend of staple fibers. For example, the fiber component can include a first plurality of individual fibers and a second plurality of individual staple fibers. The first and second pluralities of staple fibers of the blend can differ with respect to at least one of linear density value, crimp index, or length. For example, a linear density of the individual staple fibers of the first plurality of individual fibers can range from about 200 denier to about 700 denier, about 550 denier to about 650 denier, less than, equal to, or greater than about 200 denier, 250, 300, 350, 400, 450, 500, 550, 600, 650, or about 700 denier. A linear density of the individual staple fibers of the second plurality of individual fibers can range from about 800 denier to about 2000 denier, about 850 denier to about 1000 denier, less than, equal to, or greater than about 800 denier, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or 2000 denier. Blends of individual staple fibers with differing linear densities can be useful, for example, to provide an abrasive article that upon use can result in a desired surface finish. The length or crimp index of any of the individual fibers can be in accordance with the values discussed herein.

In examples of the abrasive article including blends of individual staple fibers the first and second pluralities of individual staple fibers can account for different portions of the fiber component. For example, the first plurality of individual fibers can range from about 20 wt % to about 80 wt % of the fiber component, about 30 wt % to about 40 wt %, less than, equal to, or greater than about 20 wt %, 25, 30, 35, 40, 45, 50, 55, 60, 65, 70, 75, or 80 wt %. The second plurality of individual fibers can range from about 20 wt % to about 80 wt % of the fiber component, about 60 wt % to about 70 wt %, less than, equal to, or greater than about 20 wt %, 25, 30, 35, 40, 45, 50, 55, 60, 65, 70, 75, or 80 wt %. While two pluralities of individual staple fibers are discussed herein, it is within the scope of this disclosure to include additional pluralities of individual staples fibers such as a third plurality of individual staple fibers that differs with respect to at least one of liner density value, crimp index, and/or length of the first and second pluralities of individual fibers.

The fibers of the nonwoven web can include many suitable materials. Factors influencing the choice of material include whether that material is suitably compatible with adhering binders and abrasive particles while also being processable in combination with other components of the abrasive article, and the material's ability to withstand processing conditions (e.g., temperatures) such as those employed during application and curing of the binder. The materials of the fibers can also be chosen to affect properties of the abrasive article such as, for example, flexibility, elasticity, durability or longevity, abrasiveness, and finishing properties. Examples of fibers that may be suitable include natural fibers, synthetic fibers, and mixtures of natural and/or synthetic fibers. Examples of synthetic fibers include those made from polyester (e.g., polyethylene terephthalate), nylon (e.g., nylon-6,6, polycaprolactam), polypropylene, acrylonitrile (e.g., acrylic), rayon, cellulose acetate, polyvinylidene chloride-vinyl chloride copolymer, and vinyl chloride-acrylonitrile copolymer. Examples of suitable natural fibers include cotton, wool, jute, and hemp. The fiber may be of virgin material or of recycled or waste material, for example, reclaimed from garment cuttings, carpet manufacturing, fiber manufacturing, or textile processing. The fiber may be homogenous or a composite such as a bicomponent fiber (e.g., a co-spun sheath-core fiber). The fibers can be tensilized and crimped staple fibers.

In some examples, the individual fibers can have a non-circular cross sectional shape or blends of individual fibers having a circular and a non-circular cross sectional shape (e.g., triangular, delta, H-shaped, tri-lobal, rectangular, square, dog bone, ribbon-shaped, or oval).

The abrasive article includes an abrasive component adhered to the individual fibers. The abrasive particles can range from about 5 wt % to about 70 wt % of the abrasive article, about 40 wt % to about 60 wt %, less than, equal to, or greater than about 5 wt %, 10, 15, 20, 25, 30, 35, 40, 45, 50, 55, 60, 65, or 70 wt %. The abrasive component can include individual abrasive particles.

EXAMPLES

The examples described herein are intended solely to be illustrative, rather than predictive, and variations in the manufacturing and testing procedures can yield different results. All quantitative values in the Examples section are understood to be approximate in view of the commonly known tolerances involved in the procedures used. The foregoing detailed description and examples have been given for clarity of understanding only. No unnecessary limitations are to be understood therefrom.

TABLE 1

Materials used for preparation of bonded abrasives

| Trade Name (Supplier) | Chemistry |
|---|---|
| Precision shaped grain obtainable from 3M Silver Mfr. Model # 87462 (3M) 3M ID: 42001763616 | Aluminum Oxide (Alumina) |
| SYNTHETIC IRON OXIDE RED RO3097 (KROMA) | Red Iron Oxide ($Fe_2O_3$) |
| PAF (Washington Mills) | Potassium Tetrafluoridoaluminate |
| KH-17R (KC Corporation) | Alumina Trihydroxide (ATH) |
| BW 50 (PQ Corporation) | Aqueous Sodium Silicate |
| Kasil 6 (PQ Corporation) | Aqueous Potassium Silicate |
| ZWSK F400 (Imerys) | 400 Grit Aluminum Oxide |

Precision shaped grain obtainable from 3M Silver Mfr. Model #87462) were coated first with aqueous sodium or potassium silicate solution and excess water, then with microparticles, followed by drying to remove water. PSG was added a Kitchen Aid mixer, followed by aqueous silicate.

The grain and aqueous silicate were mixed for 60 seconds, followed by stirring by hand and mixing again for 60 seconds in the Kitchen Aid mixer to homogeneously wet the grains. Powdered microparticles (iron oxide, potassium aluminum fluoride, aluminum trihydrate, etc.) were then added to the wetted grains and the mixture was stirred for 60 seconds in the mixer, then stirred by hand, followed by another 60 seconds of stirring with the Kitchen Aid mixer. Amount of grain, sodium silicate, and microparticle for each Example and Comparative Example are found in Table 2.

TABLE 2

| Example | Amount of PSG (g) | Type of Silicate | wt % Silicate | Amount of Silicate (g) | Amount of Extra Water (g) | Type of Particle | wt % Particle | Amount Particle (g) |
|---|---|---|---|---|---|---|---|---|
| Ex 1 | 500 | BW 50 | 0.5% | 2.5 | 1.25 | Iron Oxide | 2.0% | 10 |
| Ex 2 | 500 | BW 50 | 0.5% | 2.5 | 1.25 | ATH | 2.0% | 10 |
| Ex 3 | 500 | BW 50 | 0.5% | 2.5 | 1.25 | PAF | 2.0% | 10 |
| Ex 4 | 500 | Kasil 6 | 0.25% | 1.25 | 0.625 | Iron Oxide | 1.0% | 5 |
| Ex 5 | 500 | Kasil 6 | 0.25% | 1.25 | 0.625 | Iron Oxide | 4.0% | 20 |
| Ex 6 | 500 | Kasil 6 | 2.00% | 10 | 5 | Iron Oxide | 1.0% | 5 |
| Ex 7 | 500 | Kasil 6 | 2.00% | 10 | 5 | Iron Oxide | 4.0% | 20 |

TABLE 2-continued

| Example | Amount of PSG (g) | Type of Silicate | wt % Silicate | Amount of Silicate (g) | Amount of Extra Water (g) | Type of Particle | wt % Particle | Amount Particle (g) |
|---|---|---|---|---|---|---|---|---|
| CE 1 | 500 | None | 0.0% | 0 | 0 | None | 0% | 0 |
| CE 2 | 500 | BW 50 | 0.5% | 2.5 | 1.25 | None | 0% | 0 |

CE = comparative example

The coated PSG were typically dried by spreading on a pan and placing in an oven at 95° C. for 45 seconds, mixing the particles to avoid aggregation, then back in the oven at 95° C. for 45 seconds. The coated grains were then mixed and spread again and placed in the oven for 1.5 hours at 130° C. for a final drying.

Bonded Abrasive Pre-Mix Preparation

A "pre-mix" of powdered components was prepared and mixed using a food processor. The ratios of components are found in Table 3 below. The same pre-mix was used for all examples. As used in the Examples herein, novalac resin refers to a powdered phenolic resin with volume average particle sizes of less than 40 µm.

TABLE 3

| Novolac | PAF | ZWSK F400 |
|---|---|---|
| 38.6% | 53.1% | 8.4% |

Cut Off Wheel (COW) Preparation

COWs were made containing PSG (coated and un-coated), powdered premix, and liquid resol resin. As used in the Examples herein, liquid resol resin refers to resol resins with a viscosity less than 3000 centipoise at room temperature. For each example, the same ratios of grain, pre-mix and resol were used. Paraffin oil was also added to reduce dust content.

TABLE 4

| Total Mix (g) | Grain (g) | Resole (g) | Premix (g) | Paraffin Oil (mL) |
|---|---|---|---|---|
| 600 | 386.9 | 34.5 | 175.0 | 3.0 |

In a standard COW mix, the PSG was added to a Kitchen Aid mixer bowl, followed by liquid resol. This was stirred for 3.5 minutes in the mixer, followed by a hand mix, and another 3.5 minutes mixing. To this mixture, the premix was added, followed by repeating the same mixing cycle (3.5 minutes mixing, manual stir, 3.5 minutes mixing).

Next, the mixes were pressed into COWs with OD=125 mm, ID=22.2 mm, and thickness of approximately 1.8 mm. In a steel mold, a glass fiber scrim with a non-woven webbing was placed, followed by 40 grams of the mix described in the previous paragraph. The material was distributed into the mold using a rotary scraper. Then a second glass fiber scrim (without non-woven webbing), paper label, and inner diameter aluminum ring were placed into the steel COW mold. A force of 50 tons, corresponding to a pressure of 1300 psi (91 bar) was applied to the construction, which was then demolded and stacked with other COWs.

After a set was completed, the COWs were placed in an oven and cured with a cure cycle of for 30 hours at a maximum temperature of 190° C. These were then removed from the oven and stored for at least a week to equilibrate to ambient humidity.

COWs were tested using a portable saw on a stainless steel workpiece, and the performance was measured in terms of the cut rate (linear stainless steel cut, mm/s) and the wear rate (volume loss of the COW, $mm^3/s$). Specific performance was defined as the cut rate/wear rate. Results in terms of cut rate, wear rate, and "COW performance" are listed below for Examples 1-7 containing microparticle-coated PSG, and comparative examples (CE) CE 1 and CE 2 without any surface treatment, and with only a silicate coating on the PSG, respectively.

Figure 17:
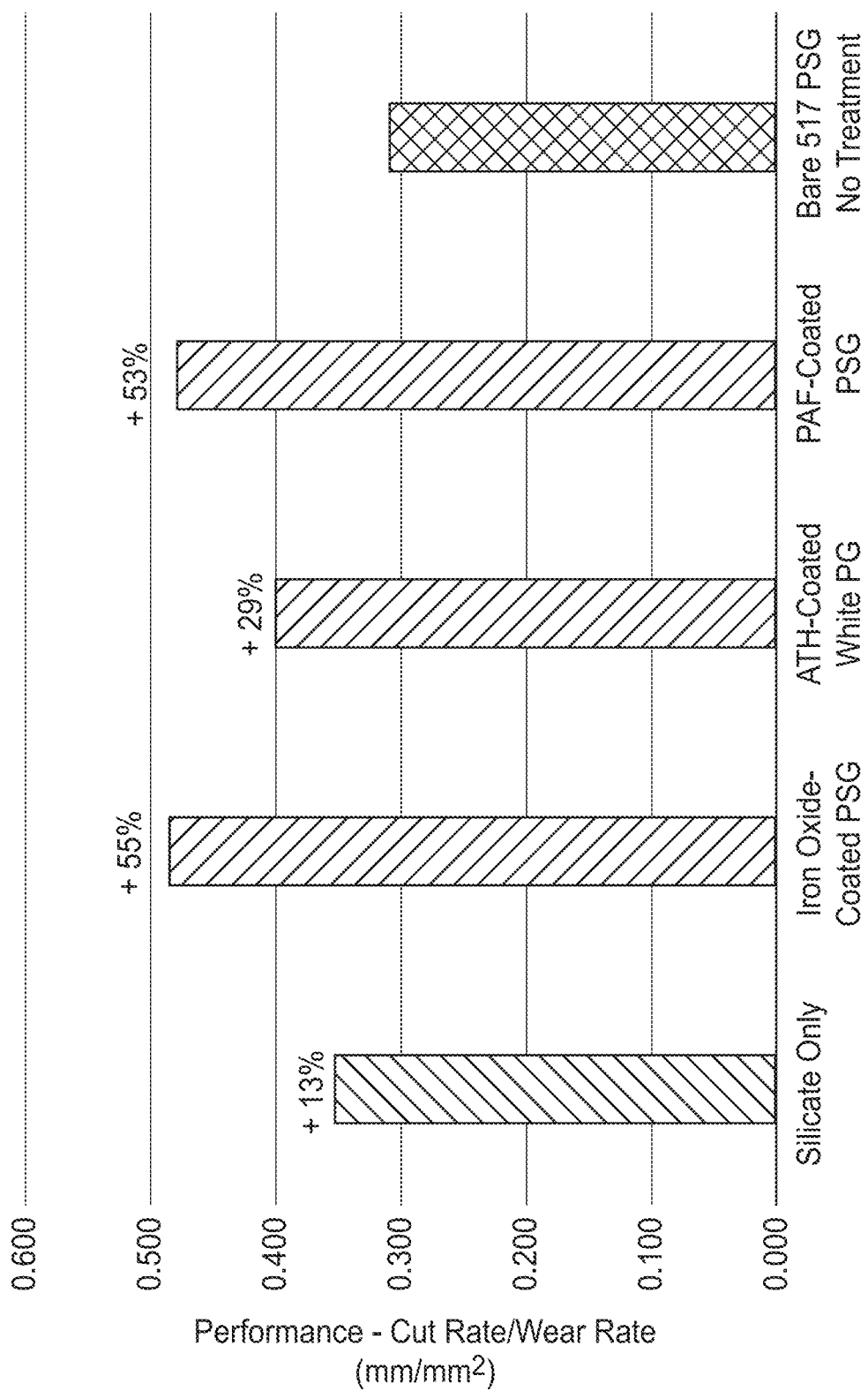
FIG. 17 is a plot of cut rate/wear rate (mm/mm$^3$) of a bonded abrasive cut off wheel cutting stainless steel.

FIG. 17 shows the cut and wear behavior plotted for Examples 1-3 and Comparative Examples 1 and 2. The data shows that the cut rate remained relatively consistent, while the wear rate was reduced for all coated PSG compared to uncoated PSG.

Examples 4-7 contain iron oxide-coated PSG using a potassium silicate binder, with varied concentration of iron oxide and potassium silicate. All Examples show reduced wheel wear rate compared with the Comparative Example CE 1, which has no particle coating.

TABLE 5

| Example | Stainless Steel Cut Rate (mm/min) | Standard Deviation of Cut Rate (mm/min) | Wheel Wear Rate ($mm^3$/min) | Standard Deviation of Wear Rate ($mm^3$/min) | Wheel Performance ($mm/mm^3$) |
|---|---|---|---|---|---|
| Ex 1 | 728 | 38 | 1502 | 36 | 0.48 |
| Ex 2 | 808 | 29 | 2041 | 296 | 0.40 |
| Ex 3 | 728 | 58 | 1541 | 149 | 0.48 |
| Ex 4 | 814 | 36 | 2124 | 211 | 0.38 |
| Ex 5 | 772 | 39 | 1808 | 148 | 0.43 |
| Ex 6 | 769 | 25 | 2432 | 469 | 0.32 |
| Ex 7 | 734 | 21 | 2360 | 218 | 0.31 |
| CE 1 | 795 | 43 | 2563 | 197 | 0.31 |
| CE 2 | 761 | 39 | 2212 | 292 | 0.35 |

Coated Abrasive Constructions

Materials used in Comparative Example 3, Examples 8 and 9 are described in Table 6. Unless otherwise noted, all parts, percentages, ratios, etc. in the Examples and the rest of the specification are by weight.

TABLE 6

| ABBRE-VIATION | DESCRIPTION |
|---|---|
| BACK | Polyester backing according to the description disclosed in Example 12 of U.S. Pat. No. 6,843,815 (Thurber et al.) |
| FIL1 | Calcium silicate obtained as M400 WOLLASTOCOAT from NYCO, Willsboro, New York |

TABLE 6-continued

| ABBRE-VIATION | DESCRIPTION |
|---|---|
| PF1 | Resole phenol-formaldehyde resin having a formaldehyde to phenol weight ratio of 1.5-2.1/1, and catalyzed with 2.5 percent potassium hydroxide |
| MIN 1 | Shaped abrasive particles prepared according to the disclosure of U.S. Pat. No. 8,142,531 (Adefris et al.). |
| MIN 2 | MIN 1 was treated with iron oxide as described in Ex. 1 |
| MIN 3 | MIN 1 was treated with PAF as described in Ex. 3 |
| FIL2 | Cryolite obtained under the trade designation CRYOLITE RTN-C from FREEBEE A/S, Ullerslev, Denmark |
| RIO | Red iron oxide pigment, obtained under the trade designation KROMA RO-3097 from Elementis, East Saint Louis, Illinois |
| TOOL1 | A transfer tooling consisting of having vertically-oriented triangular cavities with geometries such as those described in PCT Pat. Publ. No. WO 2015/100018 A1 (Adefris et al.), Abrasive belts were produced as described in PCT Pat. Publ. No. WO 2015/100018 Al (Adefris et al.). |

A make resin composition was prepared by charging 3-liter plastic container with 470 grams (g) of PF1, 410 g FIL1, and 22 g water followed by mechanical mixing. The prepared make resin was then coated onto BACK at 75-micrometer wet thickness using a 10-centimeter (cm) wide coating knife obtained from Paul N. Gardner Company, Pompano Beach, Florida, followed by smoothing the coating using a trowel by gently scrapping the top layer of coating to a final coating weight of 148 grams per square meter (gsm).

Comparative Example 3 was constructed using uncoated PSG mineral, MIN 1. MIN 1 was then loaded into TOOL1 and transferred to the resin-coated backing generally according to PCT Pat. Publ. No. WO 2015/100018 A1 (Culler et al.). The same process was repeated for MIN 2 and MIN 3 to create Example 8 and Example 9, respectively.

The belt samples were cured in a forced air oven for 90 minutes at 90° C. and 60 minutes at 103° C. Each belt sample was then coated with a size coat composition, followed by a supersize coat composition. The size coat composition was prepared by charging a 3-liter plastic container with 431.5 g of PF1, 227.5 g of FIL1, 227.5 g of FIL2 and 17 g of RIO, mechanically mixing and then diluting to a total weight of 1 kg with water. The prepared size coat composition was then coated onto the belt sample at a coverage rate of 482 grams per square meter with a 75 cm paint roller and resultant product was cured at 90° C. for 60 minutes and then at 102° C. for 8 hours more. The supersize coat composition was prepared according to the description disclosed in Example 26 of U.S. Pat. No. 5,441,549 (Helmin) starting at column 21, line 10. The prepared supersize coat composition was then coated onto the belt sample using a 75 cm paint roller with a coverage of 424 grams per meter square. The sample was cured at 90° C. for 30 minutes, 8 hours at 102° C. and 60 minutes at 109° C. After cure, the strip of coated abrasive was converted into a belt using conventional adhesive splicing practices.

The grinding performance test was conducted on 10.16-cm by 91.44-cm belts converted from coated abrasives samples made from Examples 8 and 9 and Comparative Example 3. The workpiece was a 304 stainless steel bar on which the surface to be abraded measured 1.9 cm by 1.9 cm. A 20.3-cm diameter serrated contact wheel with 70-durometer rubber, 1:1 land-to-groove ratio was used. The belt was run at 2750 rpm. The workpiece was applied to the center part of the belt at a normal force 4.54 kg to 6.8 kg. The workpiece was held 15.2 cm (6 inches) away from the thermometer sensor. The weight loss of the workpiece was measured after 15 seconds of grinding. The workpiece would then be cooled and tested again. The test was concluded after 40 cycles. Results of workpiece removal after 40 cycles, averaged over two specimens, are reported in Table 7.

TABLE 7

Material removal for coated abrasive belts on a stainless steel substrate

| Sample | Grain | Stainless Steel Removed (g) |
|---|---|---|
| CE 3 | MIN 1 | 788 |
| Ex 8 | MIN 2 | 811 |
| Ex 9 | MIN 3 | 891 |

Non-Woven Abrasive Constructions

Materials used in Example 10 and 11 and Comparative Example 4 are described in Table 8. Unless otherwise noted, all parts, percentages, ratios, etc. in the Examples and the rest of the specification are by weight.

TABLE 8

| ABBREVIATION | DESCRIPTION |
|---|---|
| AF | silicone antifoam available under the trade designation "DOW CORNING ANTIFOAM 1520 - US" from Dow Corning Corp., Midland, Michigan |
| CARBEZ3 | rheology modifier available under the trade designation "CARBOPOL EZ-3 POLYMER" from Noveon, Inc., Cleveland, Ohio |
| CARBEZ3S | 5 weight percent solution of CARBEZ3 in water |
| EP1 | epoxy resin available under the trade designation "EPI-REZ 3510-W-60" from Resolution Performance Products, Houston, Texas |
| FIB1 | 15 denier high tenacity nylon 6,6 crimp set fiber with a staple length of 1.5 inches (3.81 centimeters), obtained under the trade designation "NEXYLON PA 6.6 STAPLE FIBRES" from EMS-CHEMIE GmbH & Co. KG, Neumuenster, Germany |
| LCD4115 | carbon black dispersion available under the trade designation "LCD-4115 SPECIALTY CARBON BLACK DISPERSION" from Sun Chemical Corporation, Amelia, Ohio |
| LiSt | lithium stearate |
| LiStS | 44.7 weight percent solution of lithium stearate available under the trade designation "LITHIUMSOAP 1" from Baerlocher, Cincinnati, Ohio, in PMA |

TABLE 8-continued

| ABBREVIATION | DESCRIPTION |
|---|---|
| RESIN SYSTEM | Urethane resin system including fillers and lubricants |
| MIN 4 | Precision shaped grain (PSG) with grit size 80, obtainable from 3M Cubitron II Fibre Disc 982C, treated with Silquest A1110 Silane as described below |
| MIN 5 | MIN 4 treated with iron oxide microparticles and dried in the same way as Example 1. |
| MIN 6 | MIN 4 treated with iron oxide microparticles and dried in a similar manner compared to Example 1, except a Silquest A1110 silane surface treatment was added during the surface coating step. A thorough description is provided below. |
| MIN 4 | Equilateral triangle-shaped PSG with edge length of 500 μm with Silane Treatment |
| MIN 5 | Equilateral triangle-shaped PSG with edge length of 500 μm was treated with iron oxide microparticles and dried in the same way as Example 1. |
| MIN 6 | Equilateral triangle-shaped PSG with edge length of 500 μm (was treated with iron oxide microparticles and dried in a similar manner compared to Example 1, except a silane surface treatment was added during the surface coating step. A thorough description is provided below. |
| SiC | Silane treated 150 grit silicon carbide abrasive particles available under the trade designation "150 SIC CARBOREX C-6 SILKOTE", from Washington Mills Electro Minerals Group, Niagara Falls, New York |
| T403 | polyetheramine available under the trade designation "JEFFAMINE T-403 POLYETHERAMINE" from Huntsman International LLC, Salt Lake City, Utah |
| T403LiSt | mixture of 66.7 weight percent T403 and 33.3 weight percent LiSt |
| T403S | 25 weight percent solution of T403 in water |

Preparation of MIN 4. Silane-Treated PSG.

1000 grams of precision shaped grain (PSG) with nominal grit size 80 (obtainable from 3M Cubitron II Fibre Disc 982C) were added to a Kitchen Aid mixer bowl. In a separate container, 40.0 grams deionized water, and 0.25 grams of Silquest A1110 Silane (Momentive Specialty Chemicals) were mixed. The liquid mixture of silane and water were added to the mixer containing PSG. The PSG/liquid mixture were stirred for 0.5 minutes. The silane-coated PSG was then placed in an oven at 105° C. for 2 hours. This silane-coated PSG was defined as MIN 4.

Preparation of MIN 5. Microparticle-Coated PSG.

10 Precision shaped grain (PSG) with nominal grit size 80 were coated with iron oxide microparticles using the same formulation and process as described for Ex 1.

Preparation of MIN 6. Silane+Microparticle-Coated PSG.

2270 grams of precision shaped grain (PSG) with nominal grit size 80 were added to a Kitchen Aid mixer bowl. In a separate container, 11.35 grams of N-Silicate (PQ Corporation), 22.7 grams deionized H$_2$0, and 0.57 grams of Silquest A1110 Silane (Momentive Specialty Chemicals) were mixed. The liquid mixture of silane and silicate were added to the mixer containing PSG. The PSG/liquid mixture were stirred for 2 minutes in the Kitchen Aid, then 45.4 grams iron oxide particles were added, followed by stirring for 2 more minutes. The microparticle/silane-coated PSG was then placed in an oven at 95° C. for 10 minutes, followed by 1 hour at 130° C. This microparticle- and silane-coated PSG was defined as MIN 6.

Production of Unitized Wheels

Preparation of prebonds. A nonwoven web was formed on an air laid fiber web forming machine, available under the trade designation "RANDO-WEBBER" from the Rando Machine Corporation of Macedon, New York. The fiber web was formed from FIB1. The weight of the web was approximately 125 grams per square meter (gsm). The web was conveyed to a horizontal, two-roll coater, where a prebond resin was applied at a wet add-on weight of 50 gsm. The prebond resin had the following composition (all percentages relative to component weight): 44.4% water, 28.0% T403S, 18.7% EP1, 0.5% AF, 1% LCD4115, 2.9% T403LiSt, 4.5% CARBEZ3S. The prebond resin was cured to a non-tacky condition by passing the coated web through a convection oven at 345° F. (174° C.) for 3 minutes, yielding a prebond, nonwoven web having a basis weight of 176 gsm.

A slurry was prepared, including precision shaped abrasive particles, with the slurry having the formula described in Table 9. The slurry was prepared in batches with a weight of about 2.2 kilograms using a high-shear mixer with the speed adjusted to generate a strong vortex in the slurry while mixing. The component order of addition was in the sequence listed in Table 9.

TABLE 9

Material Amounts in Grams

| | Wheel ID | | |
|---|---|---|---|
| Raw Material | Comparative Example 4 | Example 10 | Example 11 |
| RESIN SYSTEM | 1112 | 1112 | 1112 |
| SiC | 271 | 271 | 271 |
| MIN 4 | 817 | | |
| MIN 5 | | 817 | |
| MIN 6 | | | 817 |

Unitized abrasive wheels were prepared from the prebonded nonwoven web as follows. A 12-inch (38-centimeter) wide by 12-inch (38-centimeter) long section was cut from the prebonded, nonwoven web and saturated with abrasive slurry. The saturated prebonded web was then passed through the nip of a roll coater, consisting of 6-inch (15-centimeter) diameter rolls, to remove excess slurry until the desired slurry add-on weight of 1373 gsm was obtained. The coated prebonded web was placed in a forced air oven set at 215° F. (102° C.) for 2 minutes to remove the majority of the solvent. Next, to form a single unitized slab of nonwoven abrasive material, eight sections were then stacked one on top of the other and placed in a hydraulic heated platen press set at heated platen press set at 275° F. (135° C.). A release liner was placed on both sides of the stack, prior to placing it in the oven. Consistent thickness of the unitized slab was maintained by placing 0.5 inch (1.27 centimeters) thick metal spacers in each corner of the platen. Pressure (15,000 psi, 103.4 MPa), was applied to the platens. After 30 minutes, the two sections of web had fused together into a single, unitized slab. This slab was placed in a forced air oven set at 275° F. (135° C.) for 180 minutes. After removal from the oven, the slab was cooled to room temperature, and a 6.0-inch (15.24-centimeter) diameter 0.5-inch (1.27-centimeter) thick unitized abrasive wheel with a 1-inch (2.54-centimeter) center hole was die cut from it using a SAMCO SB-25 swing beam press manufactured by Deutsche Vereinigte Schuhmaschinen GmbH & Co., Frankfurt, Germany.

Performance Testing of Unitized Wheels

The Abrasion Test measured the abrasive efficiency of comparative test wheels and was conducted using a dual-spindle automated machine. A 6-inch (15.24-centimeter) diameter 0.5-inch (1.27-centimeter) thick test wheel mounted on one spindle and a 2.0-inch (5.08-centimeter) diameter by 0.125-inch (3.175-millimeter) thick carbon steel tube workpiece mounted on the other spindle. The workpiece was set to rotate at 32 revolutions per minute and the abrasive wheel was set to rotate at 3600 revolutions per minute. The abrasive wheel and the workpiece were urged together at a load of 8 pounds (3.63 kilograms). During the test, the end of the pre-weighed rotating tube was urged against the pre-weighed wheel at the selected test load for 15-second intervals followed by a noncontact period of 15 seconds. Each Abrasion Test ran for a total of 30 minutes with the total time the workpiece contacted the wheel being 15 minutes. Total Cut was determined by the weight loss of the workpiece and the Wheel Wear was determined by the weight loss of the abrasive wheel. Results were reported as Cut and Wear in grams for each test wheel. The grams of steel cut, and the grams of wheel worn, are illustrated in Table 10.

TABLE 10

| Wheel | Cut (g steel) | Wear (g Wheel) | Abrasive Particle |
|---|---|---|---|
| CE 4 | 40 | 1.9 | MIN 4 |
| Ex 10 | 48 | 2.9 | MIN 5 |
| Ex 11 | 45 | 2.8 | MIN 6 |

Examples 12-15

TABLE 11

Materials Used for Cut Off Wheel Fabrication with and without High Aspect Ratio Microparticle Coatings on PSG

| Trade Name (Supplier) | Chemistry | Aspect Ratio of Microparticle Coating |
|---|---|---|
| PAF (Washington Mills) | Potassium Aluminum Fluoride (PAF) | About 1 |
| Iron Pyrite (Washington Mills) | Iron Sulfide (FeS$_2$) | About 1 |
| Wollastonite (Imerys Performance Additives) | Calcium Silicate | 2-5 |

TABLE 11-continued

Materials Used for Cut Off Wheel Fabrication with and without High Aspect Ratio Microparticle Coatings on PSG

| Trade Name (Supplier) | Chemistry | Aspect Ratio of Microparticle Coating |
|---|---|---|
| M400 Wollastocoat (Imerys Performance Additives) | Silane-treated Calcium Silicate | 2-5 |
| Precision shaped grain (PSG) grit size 36 obtainable from 3M Silver Mfr. Model # 87462 Product (3M) | Sintered Aluminum Oxide (Alumina) | N/A |
| N-Silicate (PQ Corporation) | Aqueous Sodium Silicate | N/A |
| ZWSK F400 (Imerys) | 400 Grit Aluminum Oxide | N/A |
| | Glass Fiber Scrims, 125 mm diameter | N/A |

TABLE 12

Formulations for Microparticle Surface Treatments on Abrasive Grains

| Example | Amount of PSG (g) | wt % Silicate | Amount of Silicate (g) | Type of Particle | wt % Particle | Amount Particle (g) |
|---|---|---|---|---|---|---|
| CE 5 | 500 | 0% | 0 | None | 0% | 0 |
| EX 12 | 500 | 0.5% | 2.5 | FeS$_2$ | 4.0% | 20 |
| Ex 13 | 500 | 0.5% | 2.5 | Wollastonite | 4.0% | 20 |
| CE 6 | 500 | 0% | 0 | None | 0% | 0 |
| EX 14 | 500 | 0.5% | 2.5 | PAF | 4.0% | 20 |
| EX 15 | 500 | 0.5% | 2.5 | M400 Wollastocoat | 4.0% | 20 |

TABLE 13

Formulations for Examples

| Example | Wt % Grain | Wt % Liquid Resol Resin | Wt % Powdered Novolac Resin | Wt % PAF | Wt % ZWSK F400 |
|---|---|---|---|---|---|
| CE 5 | 65% | 5.6% | 11.9% | 15.10% | 2.40% |
| EX 12 | 65% | 5.6% | 11.9% | 15.10% | 2.40% |
| Ex 13 | 65% | 5.6% | 11.9% | 15.10% | 2.40% |
| CE 6 | 65% | 6.1% | 11.4% | 15.10% | 2.40% |
| EX 14 | 65% | 6.1% | 11.4% | 15.10% | 2.40% |
| EX 15 | 65% | 6.1% | 11.4% | 15.10% | 2.40% |

The cut off wheels (COWs) were tested using an angle grinder and a gravity-fed tester on a 3 mm thick stainless steel sheet as described above with respect to Examples 1-7. The cut rate and wheel wear rate were measured, then used to calculate a "Total Performance" value defined as cut rate divided by wear rate. Five COW specimens were tested for each sample type.

The performance of as-made cut off wheels is shown in Table 14. The examples using high aspect ratio microparticle coatings, Ex 12 and Ex 13, demonstrated significantly higher performance than un-coated grains, and higher performance compared with microparticles with aspect ratios of approximately 1 (iron sulfide and potassium aluminum fluoride). Aspect ratios were defined as the ratio of the length of the longest axis of the particle divided by the length of the shortest axis of the particle, as measured by scanning electron microscopy and averaged over at least 10 particles

TABLE 14

COW Test Results from Incline Testing - As Made COWs

| Sample | Microparticle Coating on Abrasive Grain | Cut Rate (mm/min) | Wear Rate (mm$^3$/min) | Total Performance - Cut Rate/Wear Rate (mm/mm$^3$) | Performance Difference vs. Reference |
|---|---|---|---|---|---|
| CE 5 | None | 807 | 2915 | 0.28 | — |
| EX 12 | Iron Sulfide (FeS$_2$) | 793 | 2486 | 0.33 | 18% |
| Ex 13 | Wollastonite | 902 | 2531 | 0.388 | 33% |
| CE 6 | None | 829 | 1230 | 0.68 | — |
| EX 14 | Potassium Aluminum Fluoride | 821 | 1008 | 0.97 | 43% |
| EX 15 | Wollastocoat M400 | 835 | 826 | 1.07 | 57% |

Aging and moisture-mediated performance drop is known to be a problem for resin bonded abrasives. To study the effect of the high aspect ratio coatings on the aging behavior, selected samples were tested under accelerated aging conditions, i.e. 90° F. and 90% humidity for two weeks. The resulting samples with high aspect ratio microparticle coatings demonstrated more than 140% improved Performance over COWs with un-coated grains, and higher performance than spherical microparticle-coated grains.

TABLE 15

COW Test Results from Incline Testing - COWs after 2 Weeks Accelerated Aging

| Sample | Microparticle Coating on Abrasive Grain | Cut Rate After Accelerated Aging (mm/min) | Wear Rate After Accelerated Aging (mm$^3$/min) | Total Performance After Aging - Cut Rate/Wear Rate (mm/mm$^3$) | Performance Difference vs. Reference |
|---|---|---|---|---|---|
| CE 6 | None | 843 | 2740 | 0.32 | — |
| EX 14 | Potassium Aluminum Fluoride | 911 | 1475 | 0.64 | 100% |
| Ex 15 | Wollastocoat M400 | 884 | 1175 | 0.77 | 141% |

Precision shaped grains were coated with microparticles as in the procedure discussed above with respect to Examples 1-7. This resulted in dried grains which were processable via a typical abrasive manufacturing method. Amounts of binder and microparticle are described in Table 13.

Samples of depressed center grinding wheels were fabricated by standard grinding wheel processing methods described below. Proportions of raw materials are tabulated in Table 14.

150 grams of the produced abrasive mixture was pressed in a 5" outer diameter mold with three glass-fiber scrims (for increased burst strength) under a force of 50 tons in a hydraulic press to create a depressed center grinding wheel, such as that illustrated in FIGS. 4A-4B. The grinding wheels were cured via a typical resin bonded abrasive cure cycle such that resin degree of cure is higher than 95%.

Examples 16-20—Depressed Center Grinding Wheels

Materials:

TABLE 16

Materials used in Examples 16-20

| Trade Name (Supplier) | Chemistry |
|---|---|
| Dragonite (Applied Minerals, Inc) | Halloysite |
| Kalfren PAF (Washington Mills) | Potassium Aluminum Fluoride (PAF) |
| Wollastonite (Imerys Performance Additives) | Calcium Silicate |
| M400 Wollastocoat (Imerys Performance Additives) | Silane-treated Calcium Silicate |
| SiTuff SiC (Advanced Composite Materials LLC) | Silicon Carbide |
| Precision shaped grain grit size 36 obtainable from 3M Silver Mfr. Model # 87462 Product (3M) | Sintered Aluminum Oxide (Alumina) |
| FRSK 24 Grit Crushed Grain (Imerys) | Brown Fused Aluminum Oxide (Alumina) |
| N-Silicate (PQ Corporation) | Aqueous Sodium Silicate |
| ZWSK F400 (Imerys) | 400 Grit Aluminum Oxide Glass Fiber Scrims, 125 mm diameter |

Formulation and Mixing:

TABLE 17

Formulations for Microparticle Surface Treatments on Abrasive Grains

| Example | Amount of PSG (g) | wt % Silicate | Amount of Silicate (g) | Type of Particle | wt % Particle | Amount Particle (g) |
|---|---|---|---|---|---|---|
| CE 7 | 500 | 0% | 0 | None | 0% | 0 |
| EX 16 | 500 | 0.5% | 2.5 | Dragonite (Halloysite) | 3.0% | 15 |
| EX 17 | 500 | 0.5% | 2.5 | Potassium Aluminum Fluoride (PAF) | 3.0% | 15 |
| EX 18 | 500 | 0.5% | 2.5 | SiTuff SiC | 3.0% | 15 |
| EX 19 | 500 | 0.5% | 2.5 | Wollastonite | 3.0% | 15 |
| EX 20 | 500 | 0.5% | 2.5 | M400 Wollastocoat | 3.0% | 15 |

TABLE 18

Formulation for Depressed Center Grinding Wheels Mixes

| Example | Wt % PSG (including surface treatment) | Wt % FRSK 24 Grit | Wt % Liquid Resol Resin | Wt % Powdered Novolac Resin | Wt % PAF | Wt % ZWSK F400 |
|---|---|---|---|---|---|---|
| CE 7 | 57% | 15% | 5.0% | 8.9% | 12.2% | 1.9% |
| EX 16 | 57% | 15% | 5.0% | 8.9% | 12.2% | 1.9% |
| EX 17 | 57% | 15% | 5.0% | 8.9% | 12.2% | 1.9% |
| EX 18 | 57% | 15% | 5.0% | 8.9% | 12.2% | 1.9% |
| EX 19 | 57% | 15% | 5.0% | 8.9% | 12.2% | 1.9% |
| EX 20 | 57% | 15% | 5.0% | 8.9% | 12.2% | 1.9% |

Curing

After manufacture and pressing, wheels were cured using a standard bonded abrasive curing cycle sufficient to cause crosslinking of the resin with a degree of cure higher than 95%.

The wheels were tested using the following square bar test. Five steel bars bars were set in parallel jigs. Each cycle was ground for 2 min on a fresh bar, to bevel the corner vertex. The alternatively ground at an angle of between 12.5 and 22.5 deg on each pass as it runs up and down the bar. A total of 5 cycles (10 min) were completed using a servo Motor at 6500 rpm and 12 lbs force. The bars were ¾"× ¾"×24", AISI 1018 cold drawn carbon steel.

Test Results:

The depressed center grinding wheel (DCGW) testing resulted in significantly lower wear rate for all microparticle-coated grain. The cut rate was typically unaffected or slightly lower (within ~5%). The total G-Ratio difference was 47%-83% higher for all coated grain examples compared with the comparative examples without microparticle coated grains.

TABLE 20

Test Results from XY Testing of DCGWs

| Sample | Microparticle Coating on Abrasive Grain | Cut Rate (g/min) | Wear Rate (g/min) | G-Ratio - Cut Rate/Wear Rate | G-Ratio Difference vs. Control, CE1 |
|---|---|---|---|---|---|
| CE 7 | None | 43.3 | 1.65 | 26.6 | — |
| EX 16 | Dragonite (Halloysite) | 39.9 | 0.91 | 37.6 | 47% |
| EX 17 | PAF | 42.7 | 1.14 | 46.7 | 83% |
| EX 18 | SiTuff SiC | 39.2 | 1.01 | 45.4 | 77% |
| EX 19 | Wollastonite | 43.0 | 1.05 | 41.0 | 60% |
| EX 20 | M400 Wollastocoat | 41.1 | 1.07 | 37.8 | 48% |

An abrasive article is presented that includes a plurality of shaped abrasive particles, each shaped abrasive particle comprising a microparticulate layer disposed on at least a portion of the outer surface of the abrasive particles, wherein the microparticulate layer comprises microparticles dispersed in a microparticle binder and the abrasive particles are shaped abrasive particles; and wherein some of the microparticles have an aspect ratio greater than 2. The abrasive article also includes a binder in which the plurality of shaped abrasive particles are dispersed.

The abrasive article may be constructed such that a majority of the microparticles have an aspect ratio between 2 and 5.

The abrasive article may be constructed such that the microparticles comprise wollastonite.

The abrasive article may be constructed such that the abrasive article is a bonded abrasive article.

The abrasive article may be constructed such that the abrasive article is a cut off wheel.

The abrasive article may be constructed such that the abrasive article is a depressed center grinding wheel.

The abrasive article may be constructed such that the microparticles comprise between about 0.5% and about 4% by weight of each of the shaped abrasive particles.

The abrasive article may be constructed such that the binder is between 0.1 and 1% of each of the shaped abrasive particles, by weight.

The abrasive article may be constructed such that the microparticles are integral to the abrasive particles.

The abrasive article may be constructed such that the microparticle size ranges from about 0.5 μm to about 50 μm.

The abrasive article may be constructed such that the microparticulate layer comprises at least one of grinding aid microparticles and abrasive microparticles.

The abrasive article may be constructed such that the abrasive microparticles are made of a different material relative to the abrasive particles on which the abrasive microparticles are disposed.

The abrasive article may be constructed such that the microparticulate layer comprises grinding aid microparticles.

The abrasive article may be constructed such that the microparticles comprise at least one of iron oxides and iron sulfides.

The abrasive article may be constructed such that the microparticles comprise at least one of $FeS_2$, FeS, and $Fe_2O_3$.

The abrasive article may be constructed such that the microparticles comprise at least one of chlorinated waxes and halide salts.

The abrasive article may be constructed such that the chlorinated waxes comprise at least one of tetrachloronaphthalene, pentachloronaphthalene, and polyvinyl chloride.

The abrasive article may be constructed such that the halide salts comprise at least one of sodium chloride, potassium cryolite, sodium cryolite, ammonium cryolite, potassium tetrafluoridoaluminate, sodium tetrafluoridoaluminate, potassium tetrafluoroborate, sodium tetrafluoroborate, silicon fluorides, potassium chloride, magnesium chloride, and combinations thereof.

The abrasive article may be constructed such that the microparticles in the microparticulate layer are present in amounts of from about 0.1 wt % to about 10 wt % of the abrasive particles.

The abrasive article may be constructed such that the microparticulate layer is disposed on at least about 10% to about 90% of an outer surface of the abrasive particles.

The abrasive article may be constructed such that the microparticle binder is an inorganic binder or an organic binder.

The abrasive article may be constructed such that the inorganic binder comprises at least one of clay and silicate binders.

The abrasive article may be constructed such that the silicate binders comprise at least one of sodium silicate binder and a potassium silicate binder.

The abrasive article may be constructed such that the microparticulate layer comprises microparticles and a silane dispersed in the binder.

The abrasive article may be constructed such that the abrasive article is a coated abrasive article, a non-woven abrasive article or a bonded abrasive article.

The abrasive article may be constructed such that the abrasive article is a bonded abrasive article.

The abrasive article may be constructed such that the abrasive article is a mounted point, a cut-off wheel, a cut-and-grind wheel, a depressed center grinding wheel, a depressed center cut-off wheel, a reel grinding wheel, a mounted point, a tool grinding wheel, a roll grinding wheel, a hot-pressed grinding wheel, a face grinding wheel, a rail grinding wheel, a grinding cone, a grinding plug, a cup grinding wheel, a gear grinding wheel, a centerless grinding wheel, a cylindrical grinding wheel, an inner diameter grinding wheel, an outer diameter grinding wheel, a double disk grinding wheel or abrasive segments.

It will be apparent to those skilled in the art that the specific structures, features, details, configurations, etc., that are disclosed herein are simply examples that can be modified and/or combined in numerous embodiments. All such variations and combinations are contemplated by the inventor as being within the bounds of this disclosure. Thus, the scope of the disclosure should not be limited to the specific illustrative structures described herein, but rather extends at least to the structures described by the language of the claims, and the equivalents of those structures. To the extent that there is a conflict or discrepancy between this specification as written and the disclosure in any document incorporated by reference herein, this specification as written will control. Furthermore, all publications, patents, and patent documents referred to in this document are incorporated by reference herein in their entirety, as though they were fully set forth herein.

What is claimed is:

1. An abrasive article comprising:
a plurality of shaped abrasive particles, each shaped abrasive particle comprising:
a monolithic ceramic particle having a first planar surface and a second planar surface, wherein the second planar surface is parallel to the first planar surface;
a microparticulate layer disposed on at least a portion of the outer surface of each of the shaped abrasive particles,
wherein the microparticulate layer comprises a plurality of microparticles dispersed in a microparticle binder; and
wherein the microparticles have an aspect ratio greater than 2; and
a second binder in which the plurality of shaped abrasive particles are embedded.

2. The abrasive article of claim 1, wherein a majority of the microparticles have an aspect ratio between 2 and 5.

3. The abrasive article of claim 1, wherein the microparticles comprise wollastonite.

4. The abrasive article of claim 1, wherein the abrasive article is a bonded abrasive article.

5. The abrasive article of claim 1, wherein the microparticles comprise between about 0.5% and about 4% by weight of each of the shaped abrasive particles.

6. The abrasive article of claim 1, wherein the microparticle binder is between 0.1 and 1% of each of the shaped abrasive particles, by weight.

7. The abrasive article of claim 1, wherein the microparticle size ranges from about 0.5 μm to about 50 μm.

8. The abrasive article of claim 1, wherein the microparticles are made of a different material relative to the abrasive particles on which the abrasive microparticles are disposed.

9. The abrasive article of claim 1, wherein the microparticulate layer comprises grinding aid microparticles.

10. The abrasive article of claim 1, wherein the microparticles comprise at least one of $FeS_2$, $FeS$, and $Fe_2O_3$.

11. The abrasive article of claim 1, wherein the microparticles comprise at least one of chlorinated waxes and halide salts.

12. The abrasive article of claim 11, wherein the chlorinated waxes comprise at least one of tetrachloronaphthalene, pentachloronaphthalene, and polyvinyl chloride.

13. The abrasive article of claim 11, wherein the halide salts comprise at least one of sodium chloride, potassium cryolite, sodium cryolite, ammonium cryolite, potassium tetrafluoridoaluminate, sodium tetrafluoridoaluminate, potassium tetrafluoroborate, sodium tetrafluoroborate, silicon fluorides, potassium chloride, magnesium chloride, and combinations thereof.

14. The abrasive article of claim 1, wherein the microparticles in the microparticulate layer are present in amounts of from about 0.1 wt % to about 10 wt % of the abrasive particles.

15. The abrasive article of claim 14, wherein the abrasive article is a bonded abrasive article, wherein the second binder comprises a bond matrix, wherein the bond matrix comprises a resin bond matrix.

16. The abrasive article of claim 15, wherein the abrasive article is a mounted point, a cut-off wheel, a cut-and-grind wheel, a depressed center grinding wheel, a depressed center cut-off wheel, a reel grinding wheel, a mounted point, a tool grinding wheel, a roll grinding wheel, a hot-pressed grinding wheel, a face grinding wheel, a rail grinding wheel, a grinding cone, a grinding plug, a cup grinding wheel, a gear grinding wheel, a centerless grinding wheel, a cylindrical grinding wheel, an inner diameter grinding wheel, an outer diameter grinding wheel, a double disk grinding wheel or abrasive segments.

17. The abrasive article of claim 1, wherein the microparticulate layer is disposed on at least about 10% to about 90% of an outer surface of the abrasive particles.

18. The abrasive article of claim 1, wherein the microparticle binder is an inorganic binder or an organic binder.

19. The abrasive article of claim 1, wherein the microparticulate layer comprises a silane dispersed in the microparticle binder.

20. The abrasive article of claim 1, wherein the abrasive article further comprises:
a backing, wherein the plurality of shaped abrasive particles are adhered to the backing by the second binder, and wherein the plurality of shaped abrasive particles are aligned with each other; and
a size coat, having a different composition than the second binder, wherein the size coat is dispersed over the embedded plurality of shaped abrasive particles.

21. The abrasive article of claim 1, wherein the precisely-shaped abrasive particles comprise a truncated pyramid.

* * * * *